US009462209B2

(12) United States Patent
Imai et al.

(10) Patent No.: US 9,462,209 B2
(45) Date of Patent: Oct. 4, 2016

(54) DISPLAY CONTROL APPARATUS INCLUDING A REMOTE CONTROL FUNCTION AND A STORAGE MEDIUM HAVING STORED THEREON A DISPLAY CONTROL PROGRAM

(75) Inventors: Daiji Imai, Kyoto (JP); Masayoshi Tanimura, Kai (JP); Akira Ozawa, Kai (JP); Masanobu Sakata, Kai (JP); Tomokazu Tsuruoka, Kai (JP)

(73) Assignees: NINTENDO CO., LTD., Kyoto (JP); HAL LABORATORY INC., Tokyo (JP)

( * ) Notice: Subject to any disclaimer, the term of this patent is extended or adjusted under 35 U.S.C. 154(b) by 2679 days.

(21) Appl. No.: 12/078,759

(22) Filed: Apr. 4, 2008

(65) Prior Publication Data

US 2009/0195703 A1 Aug. 6, 2009

(30) Foreign Application Priority Data

Feb. 5, 2008 (JP) ................................ 2008-025353

(51) Int. Cl.

| | |
|---|---|
| ***H04N 5/44*** | (2011.01) |
| ***H04N 5/445*** | (2011.01) |
| ***H04N 21/422*** | (2011.01) |
| *H04N 21/485* | (2011.01) |

(52) U.S. Cl.

CPC ........ *H04N 5/4403* (2013.01); *H04N 5/44513* (2013.01); *H04N 21/42206* (2013.01); *H04N 21/485* (2013.01); *H04N 2005/4405* (2013.01)

(58) Field of Classification Search

USPC ....... 348/705, 706, 563, 569, 731, 570, 554, 348/558

See application file for complete search history.

(56) References Cited

U.S. PATENT DOCUMENTS

| | | | | |
|---|---|---|---|---|
| 6,753,928 | B1 * | 6/2004 | Gospel et al. | 348/569 |
| 7,880,816 | B2 * | 2/2011 | Kinoshita et al. | 348/705 |
| 2004/0237115 | A1 * | 11/2004 | Horiuchi et al. | 725/116 |
| 2006/0158838 | A1 * | 7/2006 | Kinoshita et al. | 361/681 |
| 2007/0072674 | A1 * | 3/2007 | Ohta et al. | 463/37 |
| 2008/0143734 | A1 * | 6/2008 | Ishii et al. | 345/581 |
| 2008/0165202 | A1 * | 7/2008 | Brodersen et al. | 345/581 |

FOREIGN PATENT DOCUMENTS

| | | |
|---|---|---|
| JP | 2004-200862 | 7/2004 |

* cited by examiner

*Primary Examiner* — John Schnurr
*Assistant Examiner* — Christine Kurien
(74) *Attorney, Agent, or Firm* — Nixon & Vanderhye P.C.

(57) ABSTRACT

A display control apparatus connected to a display apparatus, which is remotely controllable through wireless communication, generates a first video/audio signal for displaying a first image on the display apparatus, and outputs the first video/audio signal to the display apparatus. Either of a first signal pattern indicative of a command to cause the first image based on the first video/audio signal to be displayed on the display apparatus or a second signal pattern indicative of a command to cause a second image based on a second video/audio signal, which is obtained from a device different from the display control apparatus, to be displayed on the display apparatus is selected, and a wireless signal of the selected signal pattern is outputted to the display apparatus through the wireless communication. Information determined based on the signal pattern of the outputted wireless signal is informed from an apparatus different from the display apparatus.

23 Claims, 22 Drawing Sheets

F I G. 3
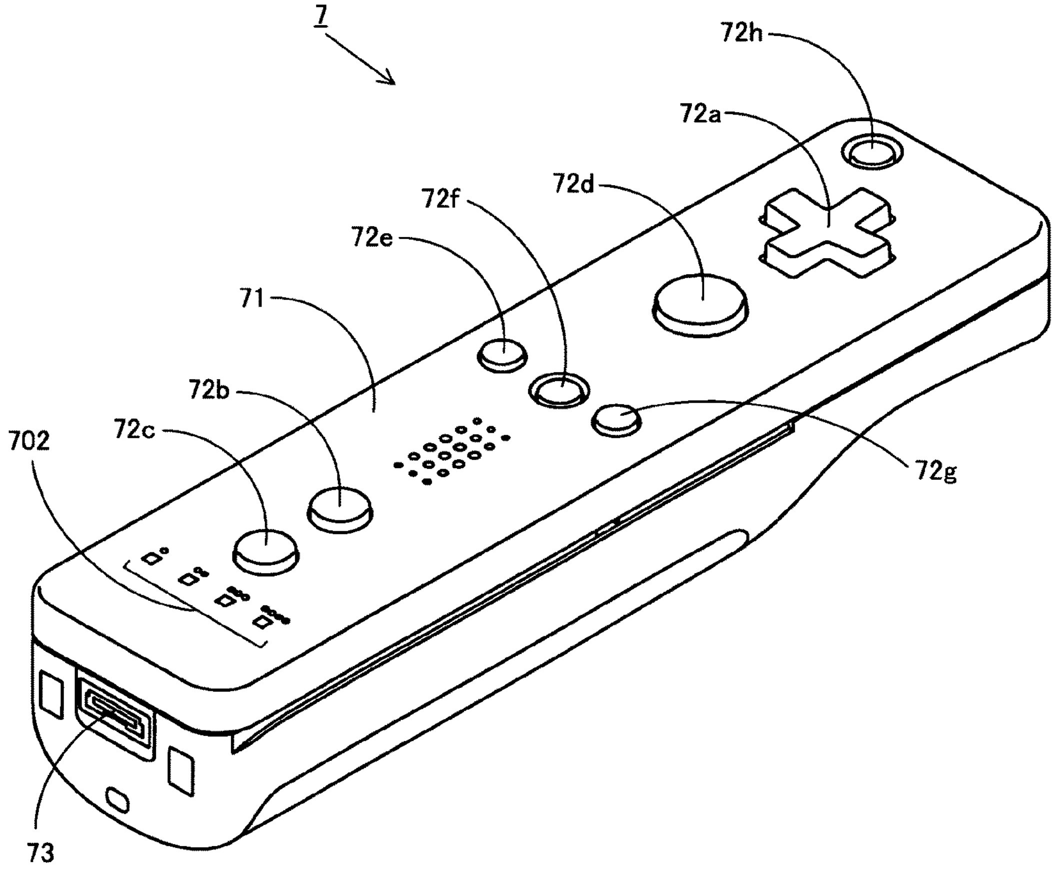

F I G. 6
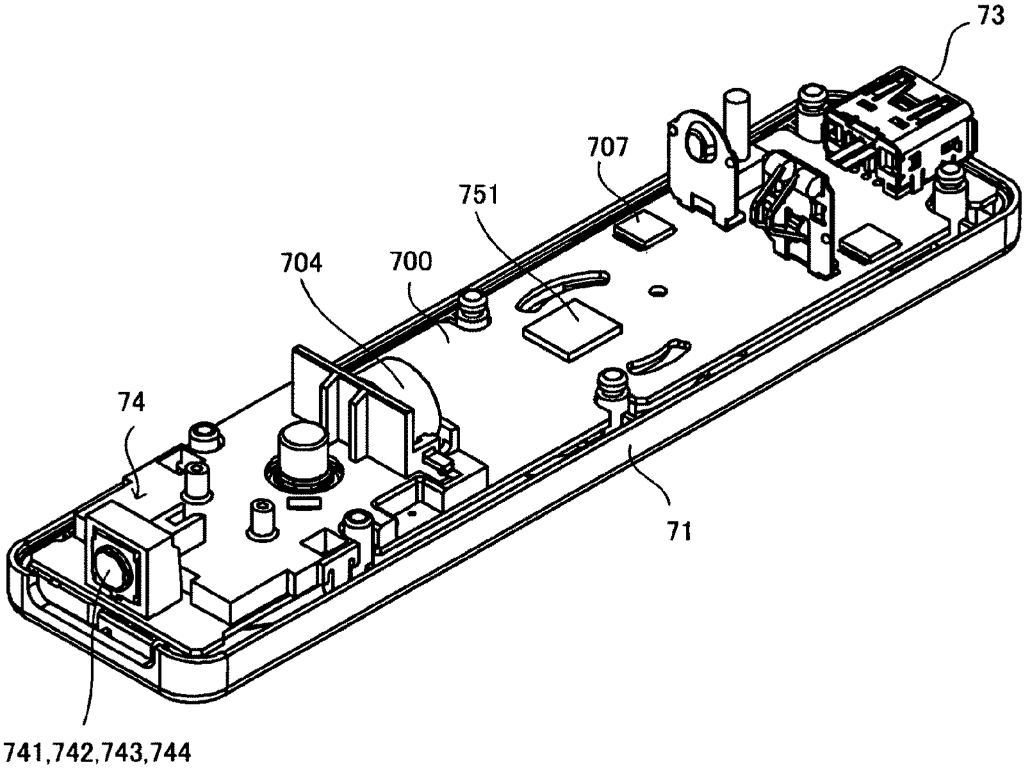

F I G. 1 0
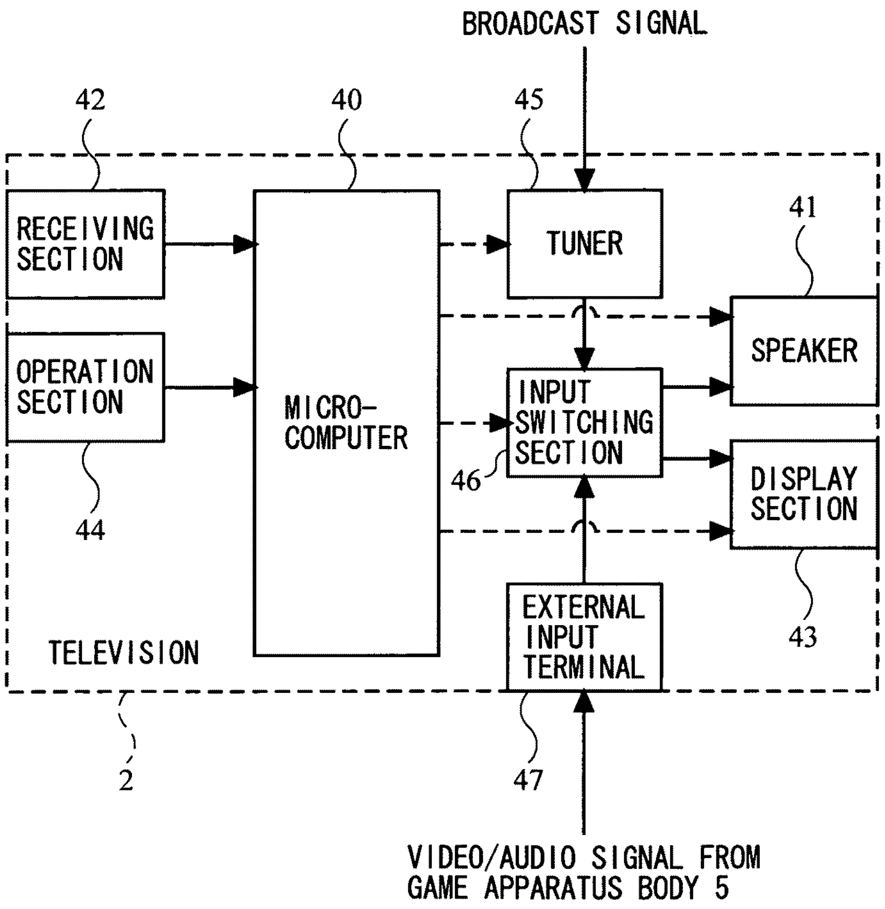

F I G. 18

Db1

| TELEVISION TYPE | | | BROADCAST CHANNEL SIGNAL | | EXTERNAL INPUT SWITCHING SIGNAL | |
|---|---|---|---|---|---|---|
| TELEVISION MANUFACTURER | COMPATIBLE BROADCAST WAVE: TERRESTRIAL DIGITAL | COMPATIBLE BROADCAST WAVE: BS DIGITAL | CH | SIGNAL PATTERN | EXTERNAL INPUT | SIGNAL PATTERN |
| COMPANY A | INCOMPATIBLE | INCOMPATIBLE | 1 | a | EXTERNAL INPUT 1 | A |
| | | | 2 | b | EXTERNAL INPUT 2 | B |
| | | | 3 | c | EXTERNAL INPUT 3 | C |
| | | | ⋮ | ⋮ | — | — |
| | INCOMPATIBLE | COMPATIBLE | 1 | f | EXTERNAL INPUT 1 | F |
| | | | 2 | g | EXTERNAL INPUT 2 | G |
| | | | 3 | h | EXTERNAL INPUT 3 | H |
| | | | ⋮ | ⋮ | EXTERNAL INPUT 4 | I |
| | COMPATIBLE | INCOMPATIBLE | 1 | k | EXTERNAL INPUT 1 | K |
| | | | 2 | l | EXTERNAL INPUT 2 | L |
| | | | 3 | m | EXTERNAL INPUT 3 | M |
| | | | ⋮ | ⋮ | EXTERNAL INPUT 4 | N |
| | COMPATIBLE | COMPATIBLE | 1 | p | EXTERNAL INPUT 1 | P |
| | | | 2 | q | EXTERNAL INPUT 2 | Q |
| | | | 3 | r | EXTERNAL INPUT 3 | R |
| | | | ⋮ | ⋮ | EXTERNAL INPUT 4 | S |
| | | | | | EXTERNAL INPUT 5 | T |
| ⋮ | ⋮ | ⋮ | ⋮ | ⋮ | ⋮ | ⋮ |

| MESSAGE NUMBER | VOICE MESSAGE |
|---|---|
| MESSAGE 1 | IS SCREEN READY FOR TELEVISION BROADCAST ? PRESS NO. 1 BUTTON IF "YES", OR PRESS NO. 2 BUTTON IF "NO". |
| MESSAGE 2 | SETTING FAILED. USE TV REMOTE CONTROL TO RETURN TO GAME SCREEN. |
| MESSAGE 3 | IS SCREEN READY FOR GAME SCREEN ? PRESS NO. 1 BUTTON IF "YES", OR PRESS NO. 2 BUTTON IF "NO". |

DISPLAY CONTROL APPARATUS INCLUDING A REMOTE CONTROL FUNCTION AND A STORAGE MEDIUM HAVING STORED THEREON A DISPLAY CONTROL PROGRAM

CROSS REFERENCE TO RELATED APPLICATION

The disclosure of Japanese Patent Application No. 2008-025353, filed Feb. 5, 2008, is incorporated herein by reference.

FIELD

The technology herein relates to a display control apparatus including a remote control function and a storage medium having stored thereon a display control program executed by the display control apparatus. In particular, certain example embodiments relate to a display control apparatus for a game apparatus or the like which includes a remote control function capable of remotely controlling a remote-controllable television receiver and the like and a storage medium having stored thereon a display control program executed by the display control apparatus.

BACKGROUND AND SUMMARY

Conventionally, as disclosed in Japanese Laid-Open Patent Publication No. 2004-200862 (hereinafter referred to as Patent document 1), known is a video/audio signal processing apparatus which is connected to a television receiver, processes thereinside a video/audio signal, and then outputs the processed video/audio signal to the television receiver. Above described Patent document 1 discloses a video/audio processing apparatus including a remote control unit (hereinafter referred to as a remote control) and a hard disk recorder which is connected to the television receiver. The television receiver includes therein a terrestrial tuner and a BS tuner. The video/audio signal outputted from the hard disk recorder is inputted to the television receiver via an external connection terminal provided to the television receiver. The remote control transmits a control signal to a remote control receiving section of the television receiver and a remote control receiving section of the hard disk recorder so as to change a broadcast channel to be viewed or to switch between signals inputted from an external apparatus.

According to the video/audio signal processing apparatus disclosed in Patent document 1, a user operates a button of the remote control, whereby signals to be viewed on the television receiver are switched. For example, in accordance with a signal from the remote control, the video/audio signal processing apparatus switches signals to be outputted to the television receiver between a terrestrial broadcast signal, which is received by the terrestrial tuner embedded in the television receiver, and the video/audio signal, which is inputted to the television receiver from the hard disk recorder via the external connection terminal.

When a piece of video/audio based on the terrestrial broadcast signal is viewed on the television receiver, a piece of video/audio based on the video/audio signal from the hard disk recorder is not outputted from the television receiver. Therefore, in the case where information needs to be informed from the hard disk recorder to the user, while the piece of video/audio based on the signal received by the tuner embedded in the television receiver is being viewed, the information cannot be informed. Further, in the case where the piece of video/audio based on the video/audio signal from the hard disk recorder cannot be viewed appropriately on the television receiver due to a connection failure, no information will be informed to the user from the television receiver, and consequently it is impossible to inform the user of any abnormality and a method or the like for addressing the abnormality.

Therefore, an object of certain example embodiments is, when one piece of video/audio based on two video/audio signals are selected so as to be outputted and displayed on a display apparatus such as a television receiver, to provide a display control apparatus capable of providing information corresponding to the selected video/audio signal from an apparatus different from the display apparatus and also to provide a storage medium having stored thereon a display control program executed by the display control apparatus.

Certain example embodiments have the following features to attain the object mentioned above. The reference numerals, step numbers, drawing numbers and the like in the parentheses indicate the correspondence with the embodiment described below in order to aid in understanding of the certain example embodiments and are not intended to limit, in any way, the scope of the present invention.

A first aspect is directed to a display control apparatus (3) connected to a display apparatus (2) which is remotely controllable by using wireless communication. The display control apparatus comprises first video/audio signal generation means (a CPU 10 executing steps 52, 81, 82; hereinafter simply denoted by step numbers), signal pattern storage means (12, 35, Db1), selection means (S55, S58, S84, S92), wireless output means (8), and informing means (706). The first video/audio signal generation means generates a first video/audio signal to display a first image (FIGS. 12 to 16, and FIG. 23) on the display apparatus and outputs the first video/audio signal to the display apparatus. The signal pattern storage means stores a first signal pattern (a signal pattern of an external input switching signal) indicative of a command to cause the first image based on the first video/audio signal to be displayed on the display apparatus, and stores a second signal pattern (signal pattern of a broadcast channel signal) indicative of a command to cause a second image based on a second video/audio signal, which is obtained from a device (45) different from the display control apparatus, to be displayed on the display apparatus. The selection means selects a signal pattern between the first signal pattern and the second signal pattern. The wireless output means outputs a wireless signal having the signal pattern selected by the selection means to the display apparatus by using the wireless communication. The informing means informs, in accordance with the signal pattern of the wireless signal outputted from the wireless output means, information (messages 1 to 3), which is determined based on the signal pattern, from an apparatus (706) different from the display apparatus.

In a second aspect based on the first aspect, an input apparatus (7) and input data acquisition means (S53, S57, S83, S87, S88, S95, and S98) are further included. The input apparatus receives an input from a user and outputs user input data (Da). The input data acquisition means acquires the user input data from the input apparatus. The informing means is provided in the input apparatus. The selection means selects the signal pattern between the first signal pattern and the second signal pattern in accordance with the user input data acquired by the input data acquisition means.

In a third aspect based on the first aspect, the informing means informs of the information by means of a voice output.

In a fourth aspect based on the first aspect, information storage means (12, 35, Db2) are further included. The information storage means previously stores a plurality of pieces of information which are determined in accordance with the signal pattern. The informing means selects one piece of information from among the plurality of pieces of information stored in the information storage means, in accordance with one signal pattern of the wireless signal outputted by the wireless output means, and informs of the selected one piece of information.

In a fifth aspect based on the fourth aspect, the informing means informs of information on the first video/audio signal (message 3) when the wireless signal having the first signal pattern is outputted. The informing means informs of information on the second video/audio signal (message 1) when the wireless signal having the second signal pattern is outputted.

In a sixth aspect based on the fourth aspect, the informing means informs of information (message 3) for encouraging a user to check whether or not the first image is displayed on the display apparatus when the wireless signal having the first signal pattern is outputted. The informing means informs of information (message 1) for encouraging the user to check whether or not the second image is displayed on the display apparatus when the wireless signal having the second signal pattern is outputted.

In a seventh aspect based on the second aspect, when the wireless signal having the first signal pattern is outputted, informing means informs of information (message 3) for encouraging the user to check whether or not the first image is displayed on the display apparatus and to input a result of the check on the input apparatus. When the wireless signal having the second signal pattern is outputted, informing means informs of information (message 1) for encouraging the user to check whether or not the second image is displayed on the display apparatus and to input a result of the check on the input apparatus.

In an eighth aspect based on the seventh aspect, when the input data acquisition means acquires the user input data indicative of the result of the check which shows that the first image or the second image is not displayed (Yes in S88, and Yes in S98 and S99), the informing means further informs of information (message 2) indicating that a remote control between the display apparatus and the display control apparatus is invalid.

In a ninth aspect based on the second aspect, the display apparatus includes a plurality of external input terminals (47) and a tuner (45). To each of the plurality of external input terminals, a video/audio signal is externally inputted. The tuner receives television signal from a broadcast station and generates the second video/audio signal. The display control apparatus is connected to any one of the plurality of external input terminals, The first signal pattern represents a command to cause the first image, which is based on the video/audio signal inputted to each of the plurality of external input terminals, to be displayed on the display apparatus, and includes a plurality of signal patterns which are different from one another and respectively correspond to the plurality of external input terminals (FIG. 18). In the case of selecting the first signal pattern, the selection means selects the plurality of signal patterns, one by one, with respect to each of the plurality of external input terminals (S92, S93, S101). The informing means checks whether or not the first image is displayed on the display apparatus when the wireless signal having the first signal pattern is outputted, and informs of information (message 3) for encouraging the user to input a result of the check to the input apparatus. The display control apparatus further comprises first signal pattern specification means (S96, Db4).

The first signal pattern specification means specifies, in accordance with the user input data (Yes in S95) acquired by the input data acquisition means, a signal pattern, from among the plurality of signal patterns, which corresponds to one of the plurality of external input terminals of the display apparatus to which the display control apparatus is connected.

In a tenth aspect based on the first aspect, the display apparatus includes an external input terminal and a tuner. To the external input terminal, an external video/audio signal is inputted. The tuner receives a television signal from a broadcast station and generates the second video/audio signal. The display control apparatus is connected to the external input terminal and outputs the first video/audio signal. The first signal pattern represents a command to cause the first image, which is based on the first video/audio signal inputted to the external input terminal, to be displayed on the display apparatus. The second signal pattern represents a command to cause the second image based on the second video/audio signal, which is generated from the television signal received by the tuner, to be displayed on the display apparatus. The informing means informs of information for encouraging a user to check whether or not the first image is displayed on the display apparatus when the wireless signal having the first signal pattern is outputted. The informing means informs of information for encouraging the user to check whether or not the second image is displayed on the display apparatus when the wireless signal having the second signal pattern is outputted.

In an eleventh aspect based on the first aspect, the display apparatus includes a plurality of external input terminals. To each of the plurality of external input terminals, a video/audio signal is externally inputted. The device for outputting the second video/audio signal and the display control apparatus are respectively connected to different ones of the plurality of external input terminals. The first signal pattern represents a command to cause the first image, which is based on the first video/audio signal outputted from the display control apparatus via one of the plurality of external input terminals, to be displayed on the display apparatus. The second signal pattern represents a command to cause the second image, which is based on the second video/audio signal outputted from the apparatus via one of the plurality of external input terminals, to be displayed on the display apparatus. The informing means informs of information for encouraging a user to check whether or not the first image is displayed on the display apparatus when the wireless signal having the first signal pattern is outputted. The informing means informs of information for encouraging the user to check whether or not the second image is displayed on the display apparatus when the wireless signal having the second signal pattern is outputted.

In a twelfth aspect based on the second aspect, the input apparatus includes pointing means (74) and a plurality of buttons (72). The pointing means is capable of pointing to an arbitrary position on the first image outputted to the display apparatus and outputs position data (Da1, Da2) for acquiring the position as the user input data. The plurality of buttons are each pressed by the user for an operation thereof, and which each outputs key data (Da3) indicative of a result of the operation as the user input data. The display control apparatus further comprises pointed to position calculation means (S53). The pointed to position calculation means calculates a pointed to position on the first image in accordance with the position data acquired by the input data acquisition means.

The selection means selects the second signal pattern when the pointed to position calculated by the pointed to calculation means stays within a predetermined area on the first image (Yes in S53). The selection means selects the first signal pattern when the key data acquired by the input data acquisition means indicates that a predetermined button, among the plurality buttons, is operated (Yes in S57).

A thirteenth aspect based on the twelfth aspect, the display apparatus includes a tuner. The tuner receives any one of television signals from a plurality of broadcast stations and generates the second video/audio signal. The display control apparatus further comprises broadcast listing generation means (S52). The broadcast listing generation means generates a broadcast listing as the first image, the broadcast listing showing broadcasts to be broadcasted by the plurality of broadcast stations. The second signal pattern represents a command to specify a broadcast station, from which the tuner is to receive the one television signal to generate the second video/audio signal, and also to cause the second image based on the second video/audio signal to be displayed on the display apparatus, and includes a plurality of different signal patterns which correspond the plurality of broadcast stations, respectively. When the pointed to position calculated by the pointed to position calculation means overlaps with one broadcast station of the plurality of broadcast stations displayed on the broadcast listing, the selection means selects a signal pattern, from among the plurality of signal patterns, corresponding to the one broadcast station.

In a fourteenth aspect based on the first aspect, the display apparatus is remotely controllable by using infrared communication. The wireless output means outputs an infrared signal of the signal pattern selected by the selection means to the display apparatus by using the infrared communication.

A fifteenth aspect is directed to a computer-readable storage medium having stored thereon a display control program which is capable of controlling wireless output means which outputs a wireless signal based on wireless communication to a display apparatus which is remotely controllable through the wireless communication, and which is executed by a computer (10) of a display control apparatus (5) connected to the display apparatus. The display control program causes the computer to function as first video/audio signal generation means, selection means, wireless output control means (S56, S58, S85, S93), and informing means. The first video/audio signal generation means generates a first video/audio signal to display a first image on the display apparatus and outputs the first video/audio signal to the display apparatus. The selection means selects, from a storage means (12, 35) of the computer, the storage means storing a first signal pattern indicative of a command to cause the first image based on the first video/audio signal to be displayed on the display apparatus and for storing a second signal pattern indicative of a command to cause a second image based on a second video/audio signal, which is obtained from a device different from the display control apparatus, to be displayed on the display apparatus, one of the first signal pattern and the second signal pattern. The wireless output control means causes the wireless signal having the signal pattern selected by the selection means to be outputted from the wireless output means. The informing means informs of, in accordance with the signal pattern of the wireless signal outputted by the wireless output means, information determined based on the signal pattern from an apparatus which is different from the display apparatus.

According to the first aspect, when one of images based on the two video/audio signals is selectively displayed on the display apparatus, the voice information corresponding to the selected video/audio signal can be informed from the apparatus which is different from the display apparatus. Therefore, when a second image (a television broadcast image) based on a broadcast signal is displayed on the display apparatus, or when a first image generated by the display control apparatus is not appropriately displayed on the display apparatus, information from the display control apparatus can be informed to the user. Further, it is possible to provide a display control apparatus having a remote control function capable of operating the display apparatus.

According to the second aspect, the informing means is provided to the input apparatus, and thus, it is possible to informs of information in the vicinity of the user operating the input apparatus, and also possible to further ensure information conveyance. Further, in accordance with an operation by the user, an appropriate signal can be selected and information can be informed of.

According to the third aspect, the information is informed of by means of the voice output, whereby even when the user focuses on the screen on the display apparatus, it is possible to draw an attention of the user, and also possible to ensure the information conveyance.

According to the fourth aspect, the informing means is capable of informing of a plurality of pieces of information, whereby various pieces of information can be informed of in accordance with the signal pattern to be outputted.

According to the fifth aspect, in accordance with a difference in the signal pattern of the wireless signal to be outputted, different pieces of information can be informed of. Further, since information relating to the signal pattern to be outputted is informed of, it is possible to inform the user of an appropriate output state of the display apparatus.

According the sixth aspect, since a type of a screen to be displayed on the display apparatus is transmitted, a state to be displayed on the display apparatus can be informed to the user, and thus user can check a remote control state.

According to the seventh aspect, the user is encouraged by information outputted from the apparatus different from the display apparatus, to input a display state to the display apparatus, whereby even when the information cannot be conveyed to the user through the display apparatus, the user can obtain a result of the input.

According to the eighth aspect, by using the result of the input by the user, the remote control state between the display apparatus and the display control apparatus can be determined. In the case the remote control is invalid therebetween, information indicating such can be informed to the user.

According to the ninth aspect, when the display control apparatus is connected to any one of the plurality of external input terminals, which is provided to the display apparatus, the external input terminal to which the display control apparatus is connected can be specified by outputting, as the first signal patterns, wireless signals having a plurality of signal patterns to the corresponding plurality of external input terminals one by one, by informing each of the wireless signals to the user, and by receiving an input by the user.

According to the tenth aspect, when one of an image based on the video/audio signal from the display control apparatus and an image based on the video/audio signal generated by the television signal received by the tuner of the display apparatus is selectively displayed and outputted on the display apparatus, the information corresponding to the selected video/audio signal can be informed of from an apparatus different from the display apparatus. Accordingly, when the television broadcast image is displayed on the display apparatus, or when the image generated by the display control apparatus is not appropriately displayed on the display apparatus, for example, it is possible to inform the user of the information from the display control apparatus.

According to the eleventh aspect, when images based on the video/audio signals, which are respectively outputted from a plurality of apparatus (the display control apparatus and an apparatus for outputting the second video/audio signal) connected to the external input terminals of the display apparatus, are selectively displayed on the display apparatus, the information corresponding to the selected video/audio signal can be informed of from an apparatus different from the display apparatus. Accordingly, when the image from the apparatus for outputting the second video/audio signal is displayed on the display apparatus, or when the image generated by the display control apparatus is not appropriately displayed on the display apparatus, it is possible to inform the user of the information from the display control apparatus.

According to the twelfth aspect, when the selection of the signal pattern to be outputted can be indicated on the screen of the display apparatus, the indication is performed by pointing an input apparatus to the screen, whereas when the indication cannot be performed on the screen of the display apparatus, the indication is performed with a button operation of the input apparatus. Accordingly, even if the image from the display control apparatus is not displayed on the display apparatus, it is possible to perform an operation for selecting the signal pattern.

According to the thirteenth aspect, the broadcast listing displayed on the display apparatus is pointed to, whereby it is possible to receive, through the tuner of the display apparatus, a television broadcast from a broadcast station having been pointed to, and also possible to view the television broadcast.

According to the fourteenth aspect, it is possible to provide the display control apparatus capable of remotely controlling the remote-controllable display apparatus by using the infrared communication.

According to the computer readable storage medium having the display control program stored thereon according to certain example embodiments, the same effect as the above-described display control apparatus can be obtained.

These and other objects, features, aspects and advantages of certain example embodiments will become more apparent from the following detailed description when taken in conjunction with the accompanying drawings.

BRIEF DESCRIPTION OF THE DRAWINGS

FIG. 3 is a perspective view of a controller 7 shown in FIG. 1 as viewed from a top rear side thereof;

FIG. 6 is a perspective view of the controller 7 shown in FIG. 4 in a state where a lower housing thereof is removed;

FIG. 10 is a block diagram showing an exemplary configuration of a television 2;

FIG. 18 is a diagram showing, in detail, an exemplary content of signal table data Db I shown in FIG. 17;

FIG. 19 is a diagram showing, in detail, an exemplary content of voice message data Db2 shown in FIG. 17;

DESCRIPTION OF THE PREFERRED EMBODIMENTS

Figure 1:
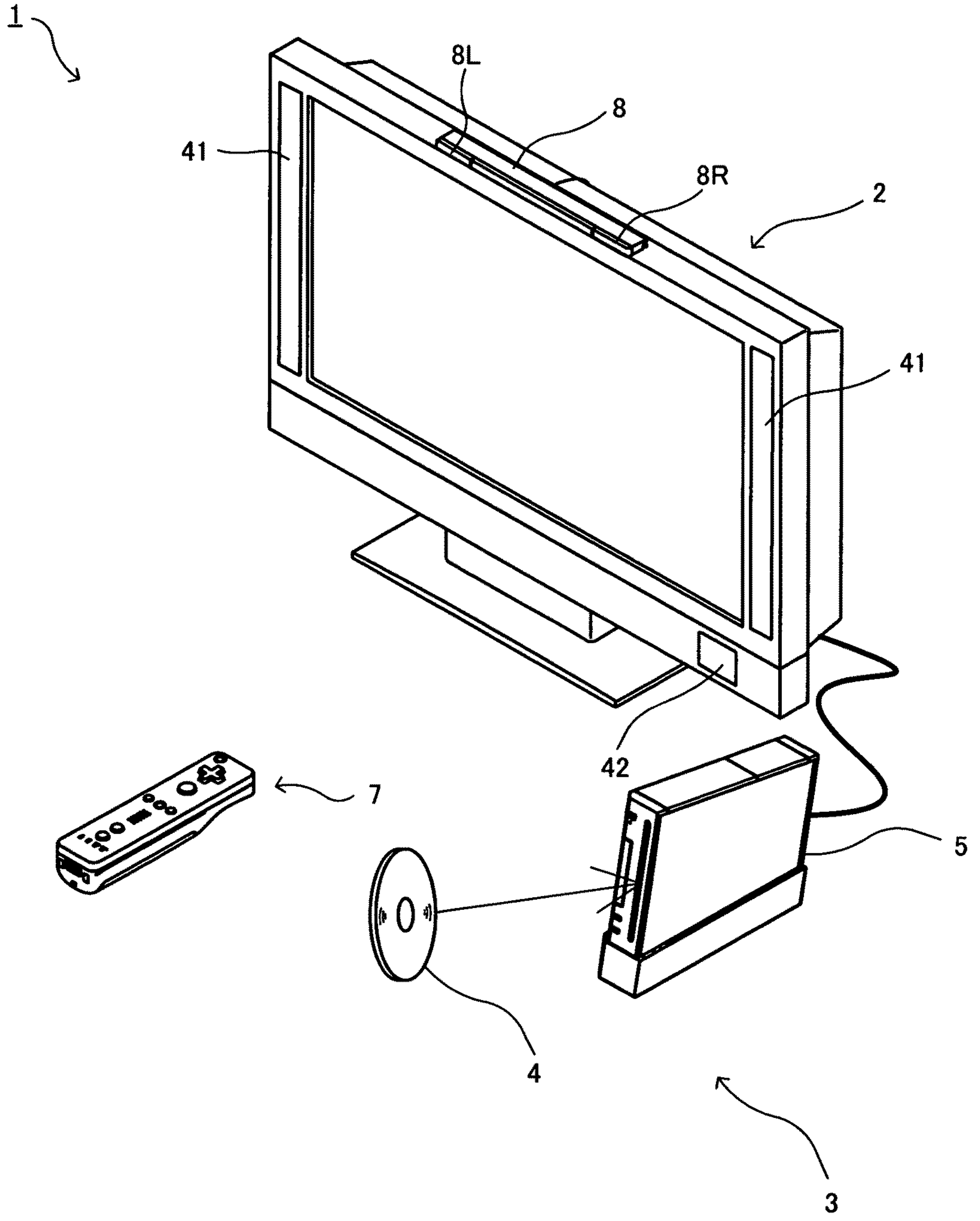
FIG. 1 is an external view illustrating a game system 1 according to one embodiment.
Figure 2:
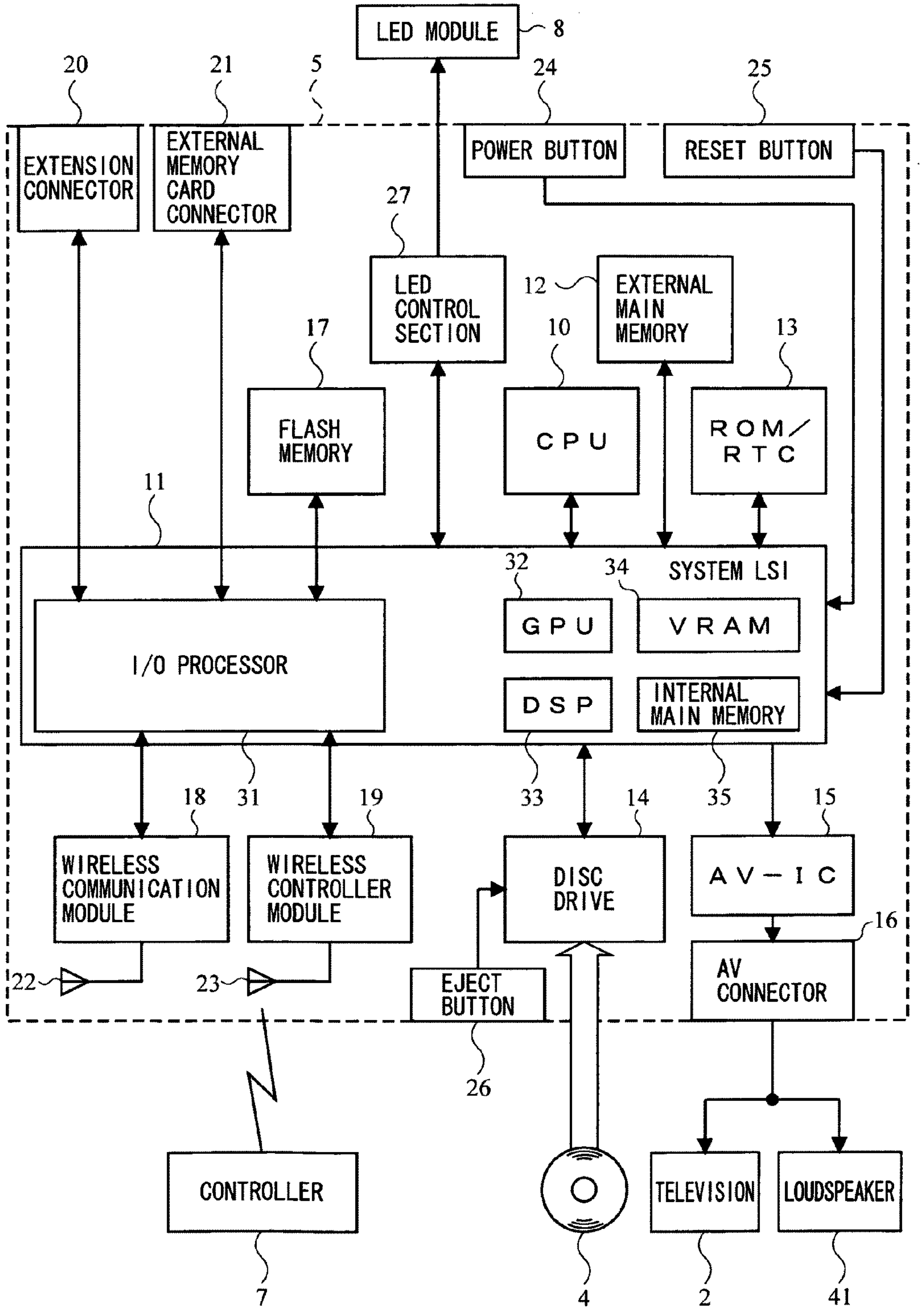
FIG. 2 is a functional block diagram of a game apparatus body 5 shown in FIG. 1.

With reference to FIG. 1, a display control apparatus for executing a display control program according to an embodiment will be described. Hereinafter, for the sake of specific explanation, a game system including a stationary game apparatus body 5 will be described as an example of the display control apparatus. FIG. 1 is an external view of a game system 1 including a stationary game apparatus 3. FIG. 2 is a block diagram of the game apparatus body 5. Hereinafter, the game system 1 will be described.

As shown in FIG. 1, the game system 1 includes a home television receiver (hereinafter simply referred to as a television) 2, which is exemplary display means, and the stationary game apparatus 3 connected to the television 2 via a connection cord. The game apparatus 3 includes an optical disc 4 having a game program stored thereon, the game apparatus body 5 incorporating a computer for executing the game program stored on the optical disc 4 and for displaying and outputting a game screen on the television 2, a controller 7 for providing the game apparatus body 5 with operational information necessary to operate a player character or the like displayed on the game screen, and an LED module 8. The television 2 includes loudspeakers 41 for outputting an audio signal outputted from the game apparatus body 5, and a receiving section 42 for receiving an infrared signal (remote control signal) from a remote control of the television 2 or from the LED module 8. The present system executes a game process on the game apparatus body 5 in accordance with a game operation using the controller 7, and also controls the television 2 in accordance with an operation using the controller 7. That is, in the present system, it is possible to use the controller 7 not only for the game operation but also as a remote control for operating the television 2.

The game apparatus body 5 is connected to the television 2 via the connection cord. Typically, the game apparatus body 5 is connected to one of external input terminals of the television 2. On the television 2, various images are displayed and various audio contents are reproduced, the images and audio contents being obtained as a result of the game process and information processing executed on the game apparatus body 5. On the periphery of the television 2 (at a side above a screen shown in FIG. 1), the LED module 8 is located. The LED module 8 has two markers 8L and 8R at both ends thereof, and is connected to the game apparatus body 5. For example, the markers 8L and 8R are each configured with one or more infrared LEDs, and each outputs infrared radiation forward from the television 2. The game apparatus body 5 is capable of controlling lighting of each of the infrared LEDs provided to the LED module 8. In the present embodiment, the markers 8L and 8R are used for the game operation using the controller 7, and also used as means for transmitting the infrared signal which controls the television 2.

The game apparatus body 5 incorporates therein a wireless controller module 19 (see FIG. 2). The wireless controller module 19 receives data wirelessly transmitted from the controller 7, and also transmits data from the game apparatus body 5 to the controller 7, thereby connecting the controller 7 and the game apparatus body 5 via wireless communication. Further, the optical disc 4, which is an exemplary information storage medium exechangeably used to the game apparatus body 5, is detachably inserted into the game apparatus body 5.

The game apparatus body 5 is equipped with a flash memory 17 (see FIG. 2) which functions as a backup memory for fixedly storing data such as various data described later and save data saved during game software processing. The game apparatus body 5 executes the game program and the like stored on the optical disc 4, and causes a result thereof as a game image on the television 2. In addition to the optical disc 4, the game program or the like may be previously stored in the flash memory 17 and then executed. Further, on the game program, by using the save data stored in the flash memory 17, it is possible to reproduce a game state previously executed and to display the game image on the monitor 2. A user of the game apparatus body 5 views the game image displayed on the monitor 2, and enjoys a progress of the game while operating the controller 7, As a first example, the display control program is previously stored in an non-volatile storage apparatus (e.g., the flash memory 17) provided in the game apparatus body 5. As a second example, the display control program is provided to the game apparatus body 5 via an external storage medium such as the optical disc 4. As a third example, the display control program is provided to the game apparatus body 5 via a wired or wireless communication line. The game apparatus body 5, on which the display control program is executed, uses broadcast listing data provided to the game apparatus body 5 through the wired or wireless communication line and causes a broadcast listing indicated by the broadcast listing data to be displayed on the television 2 and also causes a television broadcast corresponding to a broadcast channel selected from the broadcast listing to be displayed on the television 2.

The controller 7 wirelessly transmits transmission data such as operation information by using a technique of Bluetooth (registered trademark) to the game apparatus body 5 having the wireless controller module 19 embedded therein. The controller 7 is operation means mainly for operating an object and the like displayed on a display screen of the television 2 and for performing a response or the like to information from the game apparatus body 5. The controller 7 has a housing of a size small enough to be held by one hand, and also has a plurality of operation buttons (including a cross key, a stick and the like) exposed on the surface of the housing. As will become clear later, the controller 7 includes an imaging information calculation section 74 for picking up an image as viewed from the controller 7. The markers 8L and 8R are exemplary imaging targets of the imaging information calculation section 74. The controller 7 is capable of receiving, by using a communication section 75 provided therein, the transmission data wirelessly transmitted from the wireless controller module 19 of the game apparatus body 5, and of generating a sound and vibration corresponding to the transmission data.

With reference to FIG. 2, an internal configuration of the game apparatus body 5 will be described. FIG. 2 is a block diagram showing a configuration of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, the flash memory 17, and the like.

The CPU 10 executes the display control program stored in the flash memory 17 or the like, thereby performing the display control processing. That is, the CPU 10 functions as a display control processor. The CPU 10 also functions as a game processor, and executes a game process by executing the game program stored on the optical disc 4. The CPU 10 is connected to the system LSI 11. To the system LSI 11, not only the CPU 10, but also the external main memory 12, the ROM/RTC 13, the disc drive 14, the AV-IC 15 and an LED control section 27 are connected. The system LSI 11 performs processing such as control of data transmission among respective component parts connected thereto, generation of an image to be displayed, acquisition of data from an external apparatus, and the like. An internal configuration of the system LSI 11 will be described later. The external main memory 12, which is of a volatile type, stores therein programs such as the game program read from the optical disc 4 and the display control program read from the flash memory 17, and various data. The external main memory 12 is used as a work area and a buffer space for the CPU 10. The ROM/RTC 13 includes a ROM (so-called a boot ROM) incorporating a program for starting up the game apparatus body 5, and a clock circuit (RTC) for counting time. The disc drive 14 reads program data, texture data and the like from the optical disc 4, and writes the read data into an internal main memory 35 described later or the external main memory 12. The LED control section 27 is connected to the infrared LEDs included in the LED module 8. When the CPU 10 turns the infrared LEDs on, the CPU 10 issues a command to the LED control section 27 for power feeding. In response to the command from the CPU 10 for the power feeding, the LED control section 27 feeds the power to the infrared LEDs, whereby the infrared LEDs are turned on. Specifically, the LED control section 27 turns on and off the infrared LEDs provided to the LED module 8 in accordance with a signal pattern indicated by the CPU 10.

Further, provided to the system LSI 11 are an input/output (I/O) processor 31, a GPU (Graphics Processor Unit) 32, a DSP (Digital Signal Processor) 33, a VRAM (Video RAM) 34, and the internal main memory 35. Although not shown in drawings, these component parts 31 to 35 are connected to one another via an internal bus.

The GPU 32 functions as a part of drawing means, and generates an image in accordance with a graphics command (draw command) from the CPU 10. The VRAM 34 stores therein data (such as polygon data and texture data) necessary for the GPU 32 to execute the graphics command. When an image is to be generated, the GPU 32 uses data stored in the VRAM 34 and generates the image data.

The DSP33 functions as an audio processor, and generates audio data by using sound data and sound waveform (tone quality) data stored in the internal main memory 35 and the external main memory 12. In order to output a sound from the loudspeakers 2*a*, the DSP 33 reads the above-described sound data, and outputs the read data to the loudspeakers 41 via the AV-IC 15 and the AV connector 16, the loudspeakers 41 being provided on the television 2. In order to output the sound from the loudspeaker 706 (see FIG. 7) provided on the controller 7, the DSP33 reads the above-described sound data and transmits the sound data to the controller 7 via the wireless controller module 19 and an antenna 23.

The image data and the audio data generated as above described are read by the AV-IC 15. The AV-IC 15 outputs the read image data to the television 2 via the AV connector 16, and also outputs the read audio data to the loudspeakers 41 embedded in the television 2. Accordingly, the image is displayed on the television 2, and the sound is outputted from the loudspeakers 41.

The I/O processor 31 executes transmission of data among component parts connected thereto, and also executes download of data from an external apparatus. The I/O processor 31 is connected to the flash memory 17, the wireless communication module 18, the wireless controller module 19, an extension connector 20, and an external memory card connector 21. An antenna 22 is connected to the wireless communication module 18, and an antenna 23 is connected to the wireless controller module 19.

The I/O processor 31 is connected to a network via the wireless communication module 18 and the antenna 22, and is capable of communicating with another game apparatus and various servers connected to the network. The I/O processor 31 accesses the flash memory 17 at regular intervals so as to detect data, if any, which is necessary to be transmitted to the network. If the data is detected, the detected data is transmitted to the network via the wireless communication module 18 and the antenna 22. The I/O processor 31 receives data transmitted from another game apparatus and data (such as electronic broadcast listing data) downloaded from a download server via the network, the antenna 22 and the wireless communication module 18, and stores the received data in the flash memory 17. The CPU 10 executes the game program, and reads the data stored in the flash memory 17 so as to be used for executing the game program and the display control program. In the flash memory 17, not only data transmitted between the game apparatus body 5 and another game apparatus or various servers, but also save data of a game (result data or mid-stream data of the game) played by using the game apparatus body 5 may be stored.

The I/O processor 31 receives operation information and the like, which is transmitted from the controller 7 via the antenna 23 and the wireless controller module 19, and (temporarily) stores the operation information in the internal main memory 35 or in the buffer space of the external main memory 12. As with the external main memory 12, the internal main memory 35 may be used for storing therein the programs such as the game programs read from the optical disc 4 and from the flash memory 17, and various data, and may be used as the work area or the buffer space for the CPU 10.

The extension connector 20 and the external memory card connector 21 are connected to the I/O processor 31. The extension connector 20 is an interface connector as typified by a USB and an SCSI, and is capable of performing communication with the network, instead of the wireless communication module 18, by connecting thereto a medium such as an external storage medium, a peripheral device such as another controller, or a wired communication connector. The external memory card connector 21 is a connector for connecting thereto the external storage medium such as a memory card. For example, the I/O processor 31 accesses the external storage medium via the extension connector 20 or the external memory card connector 21, and then saves data or reads data.

Provided to the game apparatus body 5 (for example, on the front main surface thereof) are a power button 24 of the game apparatus body 5, a reset button 25 of the game process, an insertion slot in which the optical disc 4 is inserted, an eject button 26 for causing the optical disc 4 to be ejected from the insertion slot of the game apparatus body 5, and the like. The power button 24 and the reset button 25 are connected to the system LSI 11. When the power button is turned on, power is supplied to each of the component parts of the game apparatus body 5 via an AC adaptor, which is not shown. When the reset button 25 is pressed, the system LSI 11 reactivates the start-up program of the game apparatus body 5. The eject button 26 is connected to the disc drive 14. When the eject button 26 is pressed, the optical disc 4 is ejected from the disc drive 14.

Figure 4:
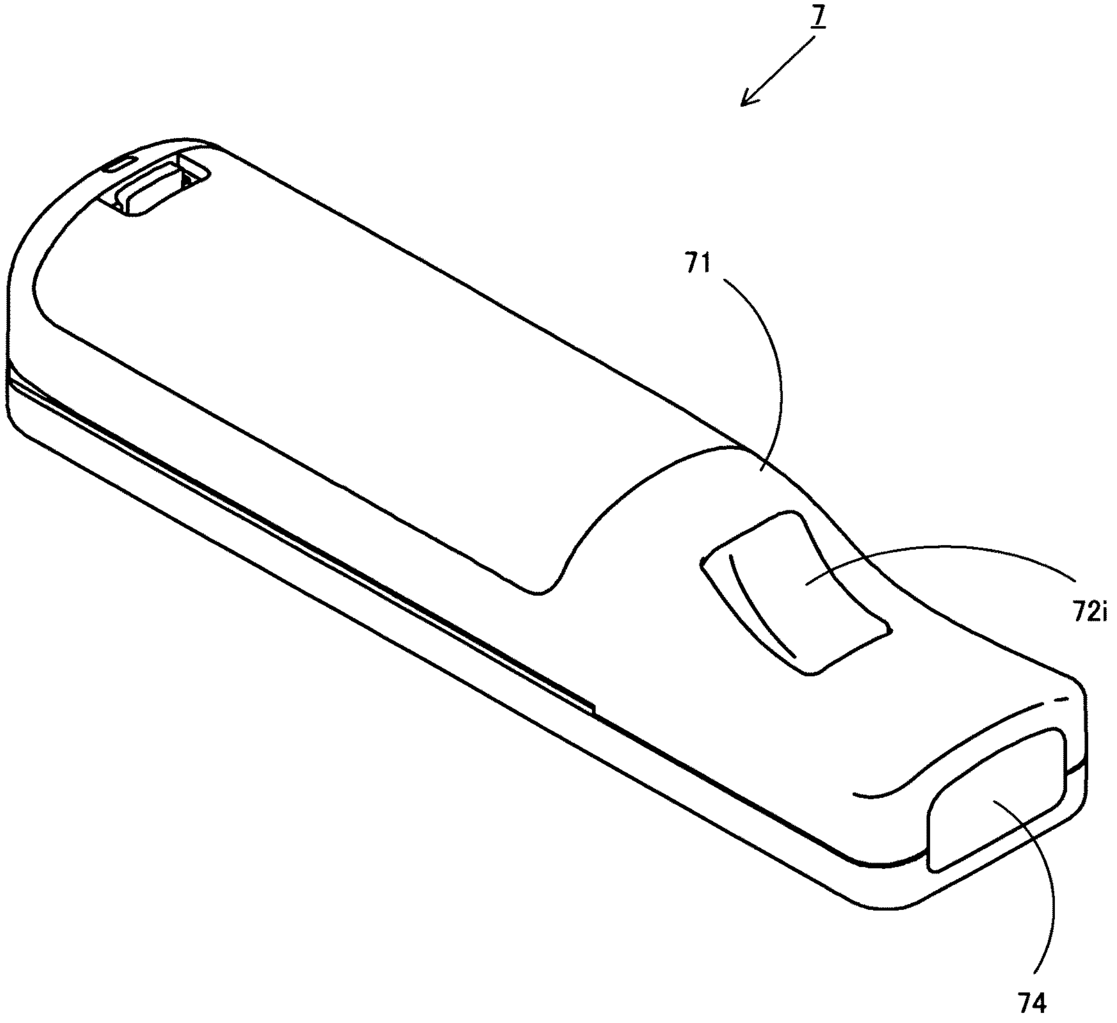
FIG. 4 is a perspective view of the controller 7 shown in FIG. 3 as viewed from a bottom front side thereof.

With reference to FIGS. 3 and 4, the controller 7 will be described. FIG. 3 is a perspective view of the controller 7 as viewed from a top rear side thereof. FIG. 4 is a perspective view of the controller 7 as viewed from a bottom front side thereof.

As shown in FIGS. 3 and 4, the controller 7 includes a housing 71, which is formed by, for example, plastic molding, and a plurality of operation sections is provided on the housing 71. The housing 71 has a substantially parallelepiped shape extending in a longitudinal direction from front to rear, and an overall size thereof is small enough to be held by one hand of an adult or even a child.

At a front center portion of a top surface of the housing 71, a cross key 72*a* is provided. The cross key 72*a* is a cross-shaped four direction push switch, and the operation portions thereof are respectively located on cross-shaped projecting portions arranged at intervals of 90 degrees such that the operation portions correspond to four directions (front, rear, right and left). A user selects one of the front, rear, right, and right directions by pressing one of the operation portions of the cross key 72*a*. Through an operation of the cross key 72*a,* the user can, for example, scroll and display a broadcast listing, indicate a direction in which a player character or the like appearing in a virtual game world is to move, or select an instruction from a plurality of choices.

The cross key 72*a* is an operation section for outputting an operation signal in accordance with the direction input operation performed by the user as above described, and such an operation may be provide in another form. For example, the operation section may be provided such that four push switches are arranged in the cross directions and an operation signal is outputted by the player's pressing one of the four push switches. Further, in addition to the four push switches, a center switch may be provided at a crossing position of the above-described cross directions so as to provide an operation section composed of the four push switches and the center switch. Alternatively, the cross key 72*a* may be replaced with an operation section which includes an inclinable stick (so called a joystick) projecting from the top surface of the housing 71 and which outputs the operation signal in accordance with an inclining direction of the stick. Still alternatively, the cross key 72*a* may be replaced with an operation section which includes a disc-shaped member horizontally slidable and which outputs an operation signal in accordance with an sliding direction of the disc-shaped member. Still alternatively, the cross key 72*a* may be replaced with a touchpad.

Behind the cross key 72*a* on the top surface of the housing 71, a plurality of operation buttons 72*b*, 72*c*, 72*d*, 72*e*, 72*f* and 72*g* is provided. The operation buttons 72*b*, 72*c*, 72*d*, 72*e*, 72*f* and 72*g* are each an operation section for outputting an operation signal assigned thereto when the user presses a head thereof. For example, functions such as a No. 1 button, a No. 2 button, an A button and the like are assigned to the operation buttons 72*b*, 72*c* and 72*d*. Further, functions such as a minus button, a home button, a plus button and the like are assigned to the operation buttons 72*e*, 72*f* and 72*g*. Various operation functions are assigned to these operation buttons 72*a*, 72*b*, 72*c*, 72*d*, 72*e*, 72*f* and 72*g* in accordance with the game program executed by the game apparatus body 5. For example, when the operation button 72*b* (No. 1 button) or the operation button 72*c* (No. 2 button) is pressed, a character size of a broadcast displayed in a broadcast listing may be changed. When the operation button 72*e* (minus button) or the operation button 72*g* (plus button) is pressed, a time axis of the displayed broadcast listing may be changed. In an exemplary arrangement shown in FIG. 3, the operation buttons 72*b*, 72*c* and 72*d* are arranged in a line at the center in a front-rear direction on the top surface of the housing 71. Further, the operation buttons 72*e*, 72*f*, and 72*g* are arranged in a line on the top surface of the housing 71 in a left-right direction between the operation buttons 72*b* and 72*d*. The operation button 72*f* has a top surface thereof buried in the top surface of the housing 71 so as not to be inadvertently pressed by the user.

In front of the cross key 72*a* on the top surface of the housing 71, an operation button 72*h* is provided. The operation button 72*h* is a power switch for turning on and off the power to the game apparatus body 5 by remote control. The operation button 72*h* also has a top surface thereof buried in the top surface of the housing 71, so as not to be inadvertently pressed by the user.

Behind the operation button 72*c* on the top surface of the housing 71, a plurality of LEDs 702 is provided. A controller type (number) is assigned to the controller 7 such that the controller 7 is distinguishable from another controller 7. The LEDs 702 are used for, for example, informing the user of the controller type currently set for the controller 7. Specifically, a signal is transmitted, from the wireless controller module 19 to the controller 7, so as to turn on a LED corresponding to the above-described controller type among the plurality of LEDs 702.

On the top surface of the housing 71, loudspeaker holes for emitting a sound from a loudspeaker (the loudspeaker 706 shown in FIG. 5), which is described later, are formed between the operation button 72*b* and the operation buttons 72*e*, 72*f* and 72*g*.

On a bottom surface of the housing 71, a recessed portion is formed. The recessed portion on the bottom surface of the housing 71 is formed in a position in which an index finger or middle finger of the user is located when the user holds the controller 7 with one hand and points a front portion thereof to the markers 8L and 8R. On a slope surface of the recessed portion, an operation button 72*i* is provided. The operation button 72*i* is an operation section acting as, for example, a B button. For example, when the user points and moves the controller 7 while pressing the operation button 72*i*, the broadcast listing may be scroll-displayed.

On a front surface of the housing 71, an image pickup element 743 constituting a part of an imaging information calculation section 74 is provided. The imaging information calculation section 74 is a system which analyzes image data picked up by the controller 7, identifies an area having high brightness in the image, and detects a position of a gravity center, a size and the like of the area. The imaging information calculation section 74 has, for example, a maximum sampling period of about 200 frames/sec., and thus can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for coupling and connecting the controller with a connection cable.

Figure 5:
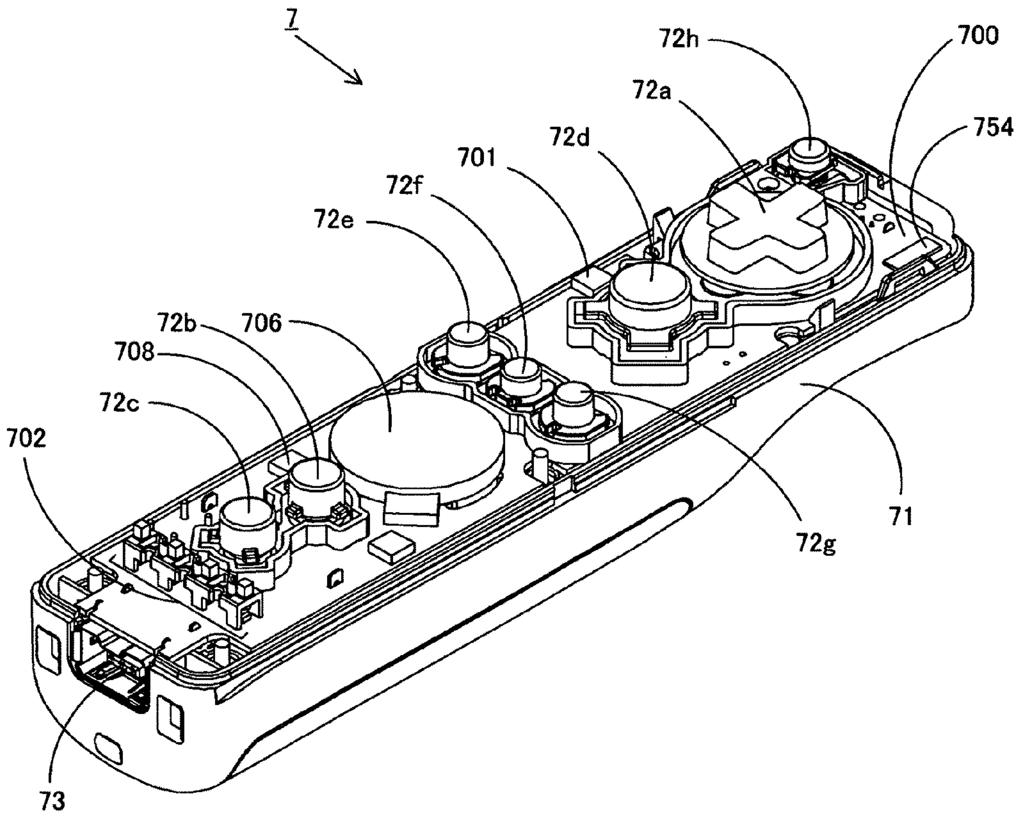
FIG. 5 is a perspective view of the controller 7 shown in FIG. 3 in a state where an upper housing thereof is removed.

With reference to FIGS. 5 and 6, an internal structure of the controller 7 will be described. FIG. 5 is a perspective view of the controller 7 as viewed from a rear side, the controller 7 being in a state where an upper housing (a part of the housing 71) of the controller 7 is removed. FIG. 6 is a perspective view of the controller 7 as viewed from a front side, the controller 7 being in a state where a lower housing (a part of the housing 71) of the controller 7 is removed. FIG. 6 is also a perspective view as viewed from a reverse side of a substrate 700 shown in FIG. 5.

As shown in FIG. 5, the substrate 700 is fixed inside the housing 71. Provided on a top main surface of the substrate 700 are the operation buttons 72*a*, 72*b*, 72c, 72*d*, 72*e*, 72*f*, 72*g* and 72*h*, an acceleration sensor 701, the LEDs 702, an antenna 754 and the like. These component parts are connected to a microcomputer 751 or the like (see FIGS. 6 and 7) by lines (not shown) formed on the substrate 700 or the like. The wireless module 753 (see FIG. 7) and the antenna 754 allow the controller 7 to act as a wireless controller. A quartz oscillator, which is not shown, is provided in an inside of the housing 71, and generates a reference clock of the microcomputer 751 described later. On the top main surface of the substrate 700, the loudspeaker 706 and an amplifier 708 are provided.

The acceleration sensor 701 is provided at the left side of the operation button 72*d* on the substrate 700 (that is, at a peripheral portion, instead of a central portion, on the substrate 700). Accordingly, the acceleration sensor 701 can detect, in accordance with a rotation centering on the longitudinal direction of the controller 7, acceleration caused by a centrifugal force element as well as directional variation in gravitational acceleration. Therefore, based on a predetermined calculation, the game apparatus body 5 and the like can detect, from the detected acceleration data, the motion of the controller 7 highly sensitively. For example, the controller 7 includes triaxial acceleration sensor 701. The triaxial acceleration sensor 701 detects linear acceleration in three directions, i.e., an up-down direction, a left-right direction and a front-rear direction. Data indicative of acceleration detected by the acceleration sensor 701 along the respective directions is outputted to the communication section 75.

As shown in FIG. 6, at a front edge of a bottom main surface of the substrate 700, the imaging information calculation section 74 is provided. The imaging information calculation section 74 includes an infrared filter 741, a lens 742, the image pick up element 743, and an image processing circuit 744, which are located in this order from the front side of the controller 7, and provided on the bottom main surface of the substrate 700. At a rear edge of the bottom main surface of the substrate 700, the connector 73 is attached. Further, on the bottom main surface of the substrate 700, a sound IC 707 and the microcomputer 751 are provided. The sound IC 707 is connected to the microcomputer 751 and the amplifier 708 by lines formed on the substrate 700 or the like, and outputs an audio signal to the loudspeaker 706 via the amplifier 708 in accordance with the audio data transmitted from the game apparatus body 5.

On the bottom main surface of the substrate 700, a vibrator 704 is attached. The vibrator 704 may be, for example, a vibration motor or a solenoid. The vibrator 704 is connected to the microcomputer 751 via the lines formed on the substrate 700 or the like, and an operation thereof is turned on and off in accordance with vibration data transmitted from the game apparatus body 5. The controller 7 is vibrated when the vibrator 704 is turned on, and vibration is conveyed to the user holding the controller 7. Thus, so-called a vibration-feedback game is realized. The vibrator 704 is located at a relatively front side of the housing 71, and thus the housing 71 vibrates to a large extent while the user is holding the housing 71, whereby the user feels vibration sensitively.

Figure 7:
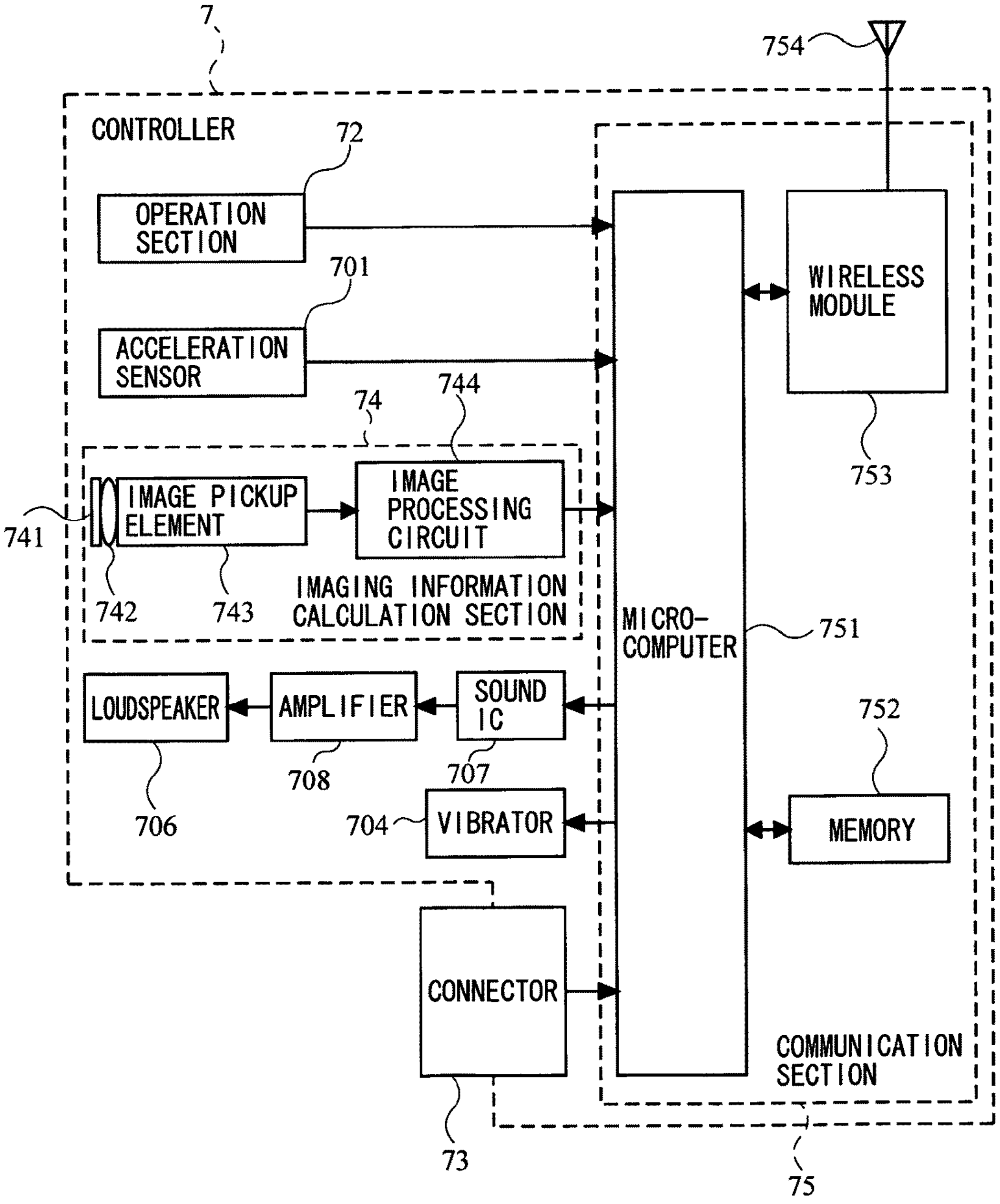
FIG. 7 is a block diagram showing a configuration of the controller 7 shown in FIG. 3.

With reference to FIG. 7, an internal configuration of the controller 7 will be described. FIG. 7 is a block diagram showing a configuration of the controller 7.

As shown in FIG. 7, the controller 7 includes thereinside the communication section 75, in addition to the operation sections 72, the imaging information calculation section 74, the acceleration sensor 701, the vibrator 704, the loudspeaker 706, the sound IC 707, and the amplifier 708 which are described as above.

The imaging information calculation section 74 includes the infrared filter 741, the lens 742, the image pickup element 743 and the image processing circuit 744. The infrared filter 741 allows only an infrared radiation to pass therethrough, the infrared radiation being included in the light which is incident on the front side of the controller 7. The lens 742 converges the infrared radiation which has passed through the infrared filter 741, and outputs the infrared radiation to the image pickup element 743. The image pickup element 743 is a solid-state image pickup element such as a CMOS sensor or a CCD, and picks up an image of the infrared radiation converged by the lens 742. In other words, the image pickup element 743 picks up the image of only the infrared radiation having passed through the infrared filter 741, and generates image data. The image data generated by the image pickup element 743 is processed by the image processing circuit 744. Specifically, the image processing circuit 744 processes the image data obtained from the image pickup element 743, detects a high brightness point thereof, and outputs, to the communication section 75, a process result data indicative of a result of the detection of a position of the high brightness point. The imaging information calculation section 74 is fixed on the housing 71 of the controller 7, and an imaging direction of the housing 71 can be changed by changing the orientation of the housing 71.

The communication section 75 includes the microcomputer 751, a memory 752, the wireless module 753 and the antenna 754. The microcomputer 751 controls the wireless module 753 for wirelessly transmitting the transmission data by using the memory 752 as a storage area at the time of processing. Further, the microcomputer 751 controls operations of the sound IC 707 and the vibrator 704 in accordance with the data received by the wireless module 753 from the game apparatus body 5 via the antenna 754. The sound IC 707 processes the sound data and the like transmitted from the game apparatus body 5 via the communication section 75. Further, the microcomputer 751 actuates the vibrator 704 in accordance with the vibration data (e.g., signal for turning the vibrator 704 ON or OFF) and the like which are transmitted from the game apparatus body 5 via the communication section 75.

Data from the controller 7 such as an operation signal (key data) from the operation section 72, acceleration signals (acceleration data) in three axes directions from the acceleration sensor 701, and the process result data from the imaging information calculation section 74 are outputted to the microcomputer 751. The microcomputer 751 temporarily stores the inputted data (the key data, the acceleration data, and the process result data) in the memory 752 as the transmission data to be transmitted to the wireless controller module 19. The wireless transmission from the communication section 75 to the wireless controller module 19 is performed at predetermined time intervals. Since the game process is generally performed at an interval of 1/60 sec., the wireless transmission needs to be performed at the interval of a shorter time period. Specifically, the game process is performed at the interval of 16.7 ms (1/60 sec.), and a transmission interval of the communication section 75, which is configured with the Bluetooth (registered trademark), is 5 ms. At a timing of performing a transmission to the wireless controller module 19, the microcomputer 751 outputs the transmission data stored in the memory 752 to the wireless module 753 as a series of pieces of operation information. Based on the Bluetooth (registered trademark) technology, for example, the wireless module 753 emits, from the antenna 754, a radio signal indicative of the operation information by using a carrier wave having a predetermined frequency. Thus, the key data from the operation section 72, the acceleration data from the acceleration sensor 701, and the process result data from the imaging information calculation section 74 are transmitted from the controller 7. The radio signal is received by the wireless controller module 19 of the game apparatus body 5, and the radio signal is then demodulated or decoded in the game apparatus body 5, whereby the series of pieces of operation information (the key data, the acceleration data and the process result data) are obtained. The CPU 10 of the game apparatus body 5 performs the game process in accordance with the obtained operation information and the game program. In the case where the communication section 75 is configured with the Bluetooth (registered trademark) technology, the communication section 75 may have a function of receiving transmission data which is wirelessly transmitted from other devices.

Figure 8:
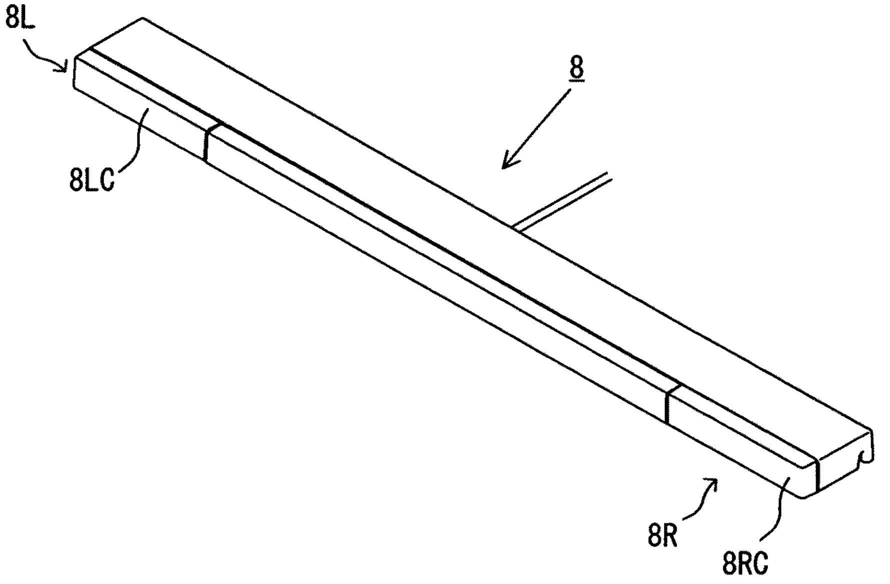
FIG. 8 is a perspective view showing an outer appearance of an LED module 8 shown in FIG. 1.
Figure 9:
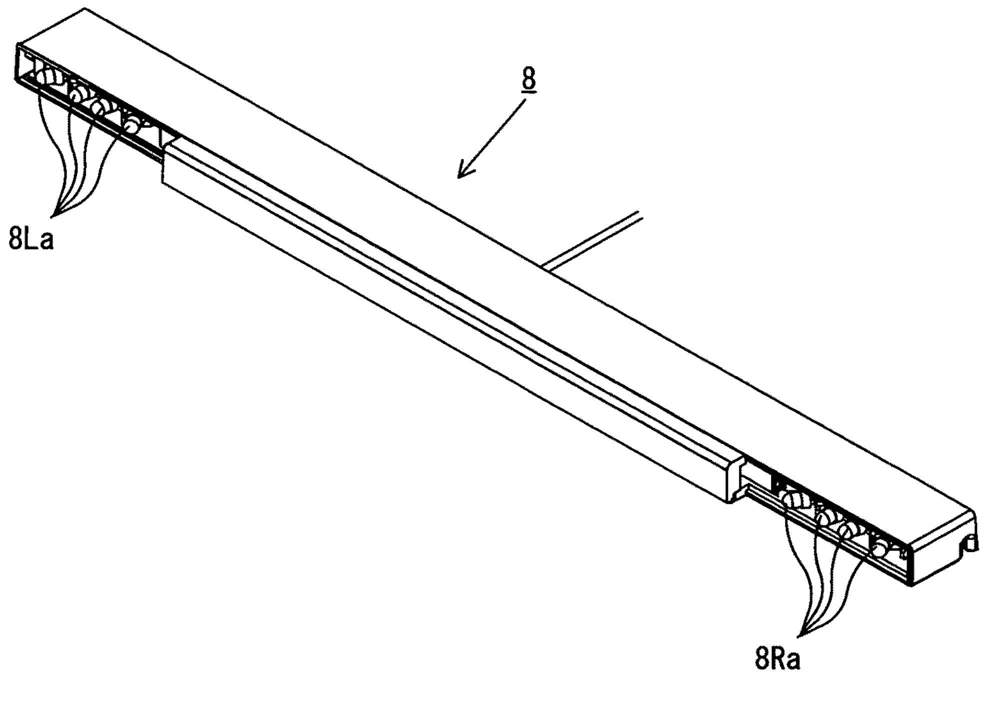
FIG. 9 is a perspective view of the LED module 8 shown in FIG. 9 in a state where covers 8LC and 8RC for respective markers 8L and 8R are removed.

With reference to FIGS. 8 and 9, the LED module 8 will be described. FIG. 8 is a perspective view showing an external appearance of the LED module 8 shown in FIG. 1. FIG. 9 is a perspective view showing the LED module 8 in a state where covers 8LC and 8RC of the markers 8L and 8R are removed.

As shown in FIG. 8, an outer shape of the LED module 8 is a rod shape. At both edges in the longitudinal direction of the LED module 8, the two markers 8L and 8R are fixed, respectively. The marker 8L has the cover 8LC and the infrared LEDs (infrared LEDs 8La shown in FIG. 9). The marker 8R has the cover 8RC and the infrared LEDs (infrared LEDs 8Ra shown in FIG. 9).

As shown in FIG. 9, the marker 8L has four infrared LEDs 8La. The marker 8R has four infrared LEDs 8Ra. The four infrared LEDs 8La are located close to one another, the imaging information calculation section 74 in the controller 7 picks up images of the four LEDs 8La as one image. The four LEDs 8La are arranged horizontally in a line along the longitudinal direction of the LED module 8 such that a radiation direction of infrared radiations from four LEDS 8La is radial. That is, outer two of the four infrared LEDs 8La, which are arranged horizontally in the line, are arranged so as to face an outer side compared to inner two of the infrared LEDs 8La. Accordingly, an irradiation angle of all of the four infrared LEDs 8La (an irradiation angle of the marker 8L) is widened in a horizontal direction of the LED module 8. Therefore, when the LED module 8 is fixed to the periphery of the television 2, the controller 7 can receive the infrared radiation from the marker 8L in a wide range including left and right sides of the front surface of the television 2. That is, the user can user the controller 7 in the wide range including the left and right sides of the front surface of the television 2. The four infrared LEDs 8Ra are arranged in the same manner as the infrared LEDs 8La. In another embodiment, the marker may have any number of infrared LEDs. In the case where the marker has a plurality of infrared LEDs, the infrared LEDs are preferably arranged horizontally in line so as to irradiate the infrared radiation radially. Further, the marker may be configured with one infrared LED and a cover which diffuses the infrared radiation from the infrared LED.

With reference to FIG. 10, the television 2 will be described. FIG. 10 is a block diagram showing an exemplary configuration of the television 2.

As shown in FIG. 10, the television 2 includes a microcomputer 40, the loudspeakers 41, a light receiving section 42, a display section 43, an operation section 44, a tuner 45, an input switching section 46, and an external input terminal 47. The operation section 44 is input means for operating various functions of the television 2 such as a power ON/OFF switch, a channel switch, and a volume switch. An operation signal indicative of an operation performed by using each of the switches of the operation section 44 is outputted to the microcomputer 40. The light receiving section 42 receives the infrared signal (remote control signal) from a remote control of the television 2 or from the LED module 8. The infrared signal received by the light receiving section 42 is converted into an electrical signal and then outputted to the microcomputer 40.

The tuner 45 receives a broadcast signal from a broadcast station. The external input terminal 47 is at least one terminal provided to the television 2 so as to input the video/audio signal from an external apparatus to the television 2. The game apparatus body 5, a video/audio recording and/or reproduction apparatus and the like are connected to the external input terminal 47. In accordance with control by the microcomputer 40, the input switching section 46 switches video/audio signals to be displayed on the display section 43 and to be outputted to the loudspeakers 41. The input switching section 46 selects one audio/video signal from among a video/audio signal based on the broadcast signal received by the tuner 45, a video/audio signal outputted from the game apparatus body 5 via the external input terminal 47, and a video/audio signal outputted from the video/audio recording and/or reproduction apparatus via the external input terminal 47, and then outputs the selected signal to the display section 43 and the loudspeakers 41.

The microcomputer 40 controls various component parts such as the loudspeakers 41, the display section 43, the tuner 45, and the input switching section 46 in accordance with the signal from the light receiving section 42 or from the operation section 44. For example, at the time of receiving a signal for switching the video/audio signal to be viewed on the television 2, the microcomputer 40 switches the video/audio signal to be outputted from the input switching section 46 in accordance with the received signal. At the time of receiving a signal for switching the broadcast channel to be viewed on the television 2, the microcomputer 40 switches the channel received by the tuner 45 in accordance with the received signal. At the time of receiving a signal for switching ON/OFF the power, the microcomputer 40 stops feeding power to the respective component parts. Alternatively, at the time of receiving a signal for changing a volume, the microcomputer 40 changes the volume of a sound outputted from the loudspeakers 41.

Figure 11:
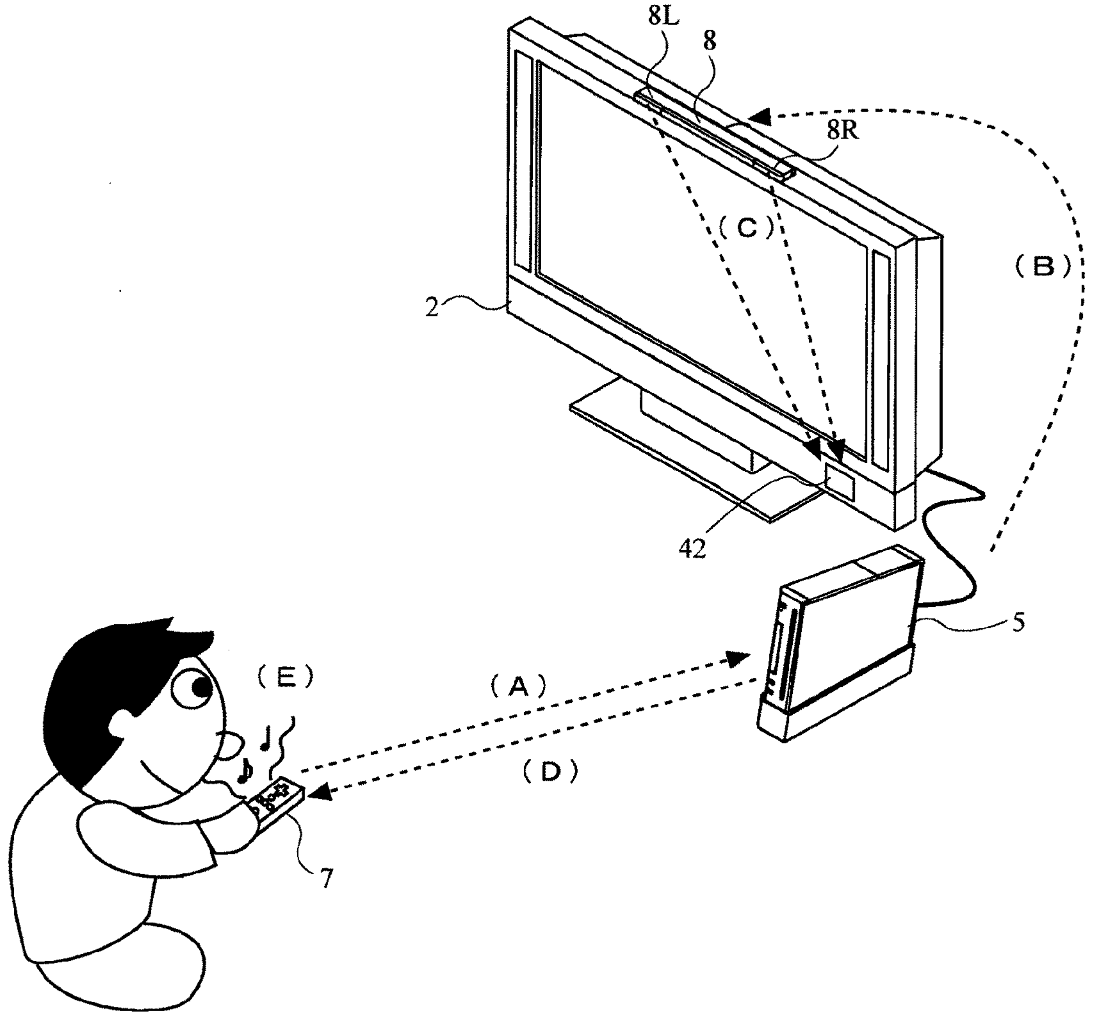
FIG. 11 is an illustrative diagram showing an appearance in which the game system 1 is operated by using the controller 7.

FIG. 11 is an illustrative diagram showing an appearance in which the game system 1 is operated by using the controller 7. For an operation on the game system 1 by using the controller 7, a user holds the controller 7 by one hand (e.g., the right hand).

In the present embodiment, when the power of the game apparatus body 5 is turned on, the television 2 becomes controllable by the controller 7. Under this situation, when the user presses a button to view a television broadcast on the television 2, operation data indicating that the button is pressed is transmitted from the controller 7 to the game apparatus body 5 (an arrow (A) shown in FIG. 11). Accordingly, the game apparatus body 5 provides a command, to the LED module 8, to transmit the infrared signal for displaying a television broadcast screen on the television 2 (an arrow (B) shown in FIG. 11). In accordance with the command, each of the markers 8L and 8R of the LED module 8 irradiates the infrared signal for displaying the television broadcast screen on the television 2 (an arrow (C) shown in FIG. 11). The irradiated infrared signal is received by the light receiving section 42 of the television 2. The infrared radiation from each of the markers 8L and 8R is received at the light receiving section 42 in a form of direct light thereof, or in a form of reflected light thereof, which is reflected by materials existing in a surrounding area of the light receiving section 42 (such as materials situated in a room, a wall and a widow glass of the room, and the like).

The infrared signal is received by the light receiving section 42, whereby the television broadcast screen is displayed on the display screen of the television 2.

In the present embodiment, in the case of selectively outputting and displaying, on the television 2, one piece of video/audio based on two video/audio signals (for example, the video/audio signal from the game apparatus body 5 and the video/audio signal based on the broadcast signal received by the tuner 45 of the television 2) (in the case of the above-described example, the video/audio signal based on the broadcast signal is selected as a display target), voice information corresponding to the selected video/audio signal is provided from the controller 7, which is an apparatus different from the television 2. For example, in the above-described state, data indicative of a voice message which encourages the user to check whether or not the television broadcast is displayed on the television 2 is transmitted from the game apparatus body 5 to the controller 7 (an arrow (D) shown in FIG. 11). The controller 7 then outputs a voice message corresponding to the received data to the loudspeaker 706 (an arrow (E) shown in FIG. 11). Accordingly, information from the game apparatus body 5 can be provided to the user even when the television broadcast image based on the broadcast signal is displayed on the television 2 or when an image generated by the game apparatus body 5 is not appropriately displayed on the television 2.

As to the operation of the television 2 like this performed by using the controller 7, other operations of the television 2 may be performed by using the controller 7. For example, the power ON/OFF of the television 2, switching of the video/audio signal to be viewed on the television 2, switching of the television channel to be viewed and the like can be performed by using the infrared signal from the LED module 8. In this manner, according to the present embodiment, when the user operates the television 2, the user does not need to find the remote control of the television 2, but is able to operate the television 2 and the game apparatus body 5 by using only the controller 7.

Further, a position and the like pointed to by the controller 7 may be used as the operation data. For example, the user holds the controller 7 such that the front surface (an entrance side on which light picked up by the imaging information calculation section 74 is incident) of the controller 7 faces the television 2. On the other hand, in the proximity of the display screen of the television 2, two markers 8L and 8R are arranged. The markers 8L and 8R each outputs the infrared radiation forward from the monitor 2, and also constitutes an imaging target of the imaging information calculation section 74. The game apparatus body 5 calculates the position pointed to by the controller 7 by using positional data on the high brightness points generated by the two markers 8L and 8R.

When the user holds the controller 7 such that the front surface thereof faces the television 2, the infrared radiation outputted from each of the markers 8L and 8R are incident on the imaging information calculation section 74. The image pickup element 743 picks up images of the incident infrared radiation via the infrared filter 741 and the lens 742, and the image processing circuit 744 processes the picked up images. In the imaging information calculation section 74, components of the infrared radiation outputted from each of the markers 8L and 8R are detected, whereby positional information (positions of target images) and the like of the markers 8L and 8R on the picked up images are obtained. Specifically, the image processing circuit 744 analyzes the image data picked up by the image pickup element 743, eliminates, from area information of the picked up images, images which are not generated by the infrared radiation outputted from the markers 8L and 8R, and then determines the high brightness points as the positions of the markers 8L and 8R. The imaging information calculation section 74 obtains the positional information such as barycentric positions of the determined high brightness points, and outputs the positional information as the process result data. The positional information, which is the process result data, may be outputted as a coordinate point value whose origin point is set to a predetermined reference point on a picked up image (e.g., the center or the left top corner of the picked up image). Alternatively, a brightness point position at a predetermined timing may be set as a reference point position, and a difference between the reference point position and a current brightness point position may be outputted as a vector. That is, in the case where the predetermined point is set on the picked up image picked up by the image pickup element 743, the positional information on target images is used as parameters representing differences between the position of the target images and the reference point position. The positional information is transmitted to the game apparatus body 5, whereby, based on the differences between the reference point and the positional information, the game apparatus body 5 is capable of obtaining variations in signals which correspond to a movement, an attitude, a position and the like of the imaging information calculation section 74, i.e., the controller 7, with respect to the markers 8L and 8R. Specifically, when the controller 7 is moved, the barycentric positions of the high brightness point positions in the images transmitted from the communication section 75 change. Therefore, a direction and a coordinate point are inputted in accordance with the change in the barycentric positions of the high brightness points, whereby the position pointed to by the controller 7 may be regarded as an operation input, and the direction and the coordinate point may be inputted in accordance with a direction in which the controller 7 moves.

In this manner, the imaging information calculation section 74 of the controller 7 picks up the markers (the infrared radiation from the markers 8L and 8R in the embodiment) which are located fixedly, whereby data outputted from the controller 7 is processed in the process on the game apparatus body 5, and an operation can be performed in accordance with the movement, the attitude, the position and the like of the controller 7. Further, it becomes possible to perform an intuitive operation input which is different from an input by pressing the operation button and the operation key. Since the above-described markers are located in the proximity of the display screen of the monitor 2, a position of the controller 7 with respect to the markers can be easily converted to the movement, the attitude, position and the like of the controller 7 with respect to the display screen of the television 2. That is, the process result data based on the movement, the attitude, the position and the like of the controller 7 is used as the operation input directly reflected on the display screen of the television 2 (e.g., an input of the position pointed to by the controller 7).

Figure 12:
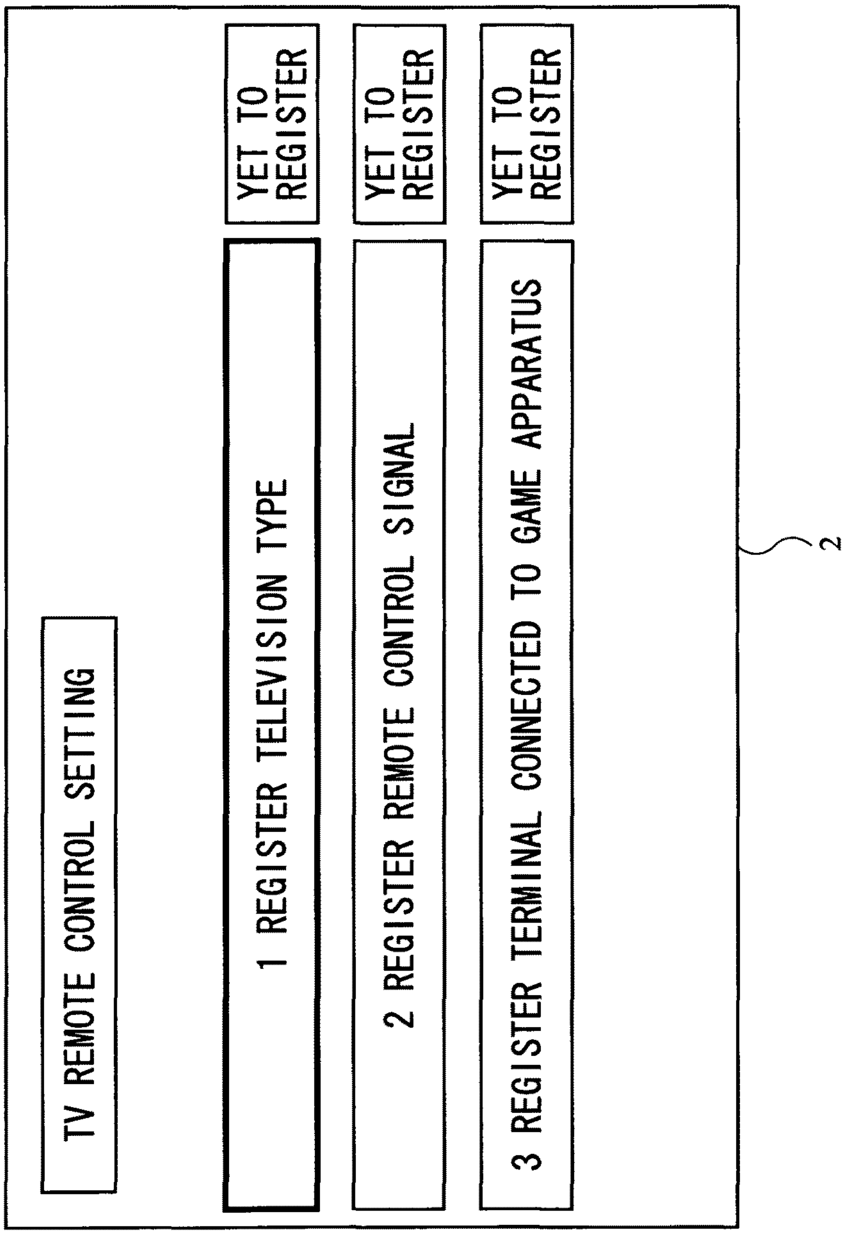
FIG. 12 is an example of a first stage screen displayed on the television 2 at the time of setting to cause the television 2 to be controllable by an operation of the controller 7.
Figure 13:
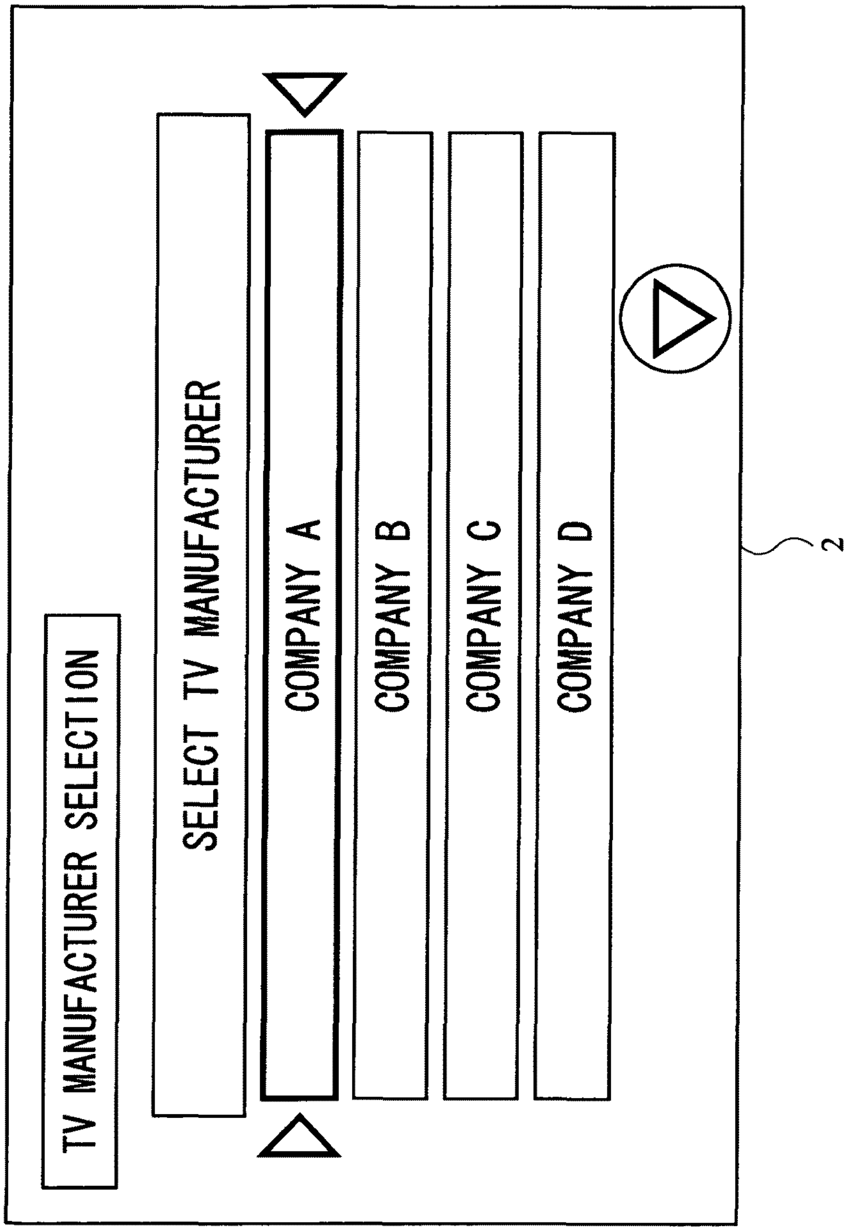
FIG. 13 is an example of a second stage screen displayed on the television 2 at the time of setting to cause the television 2 to be controllable by the operation of the controller 7.
Figure 14:
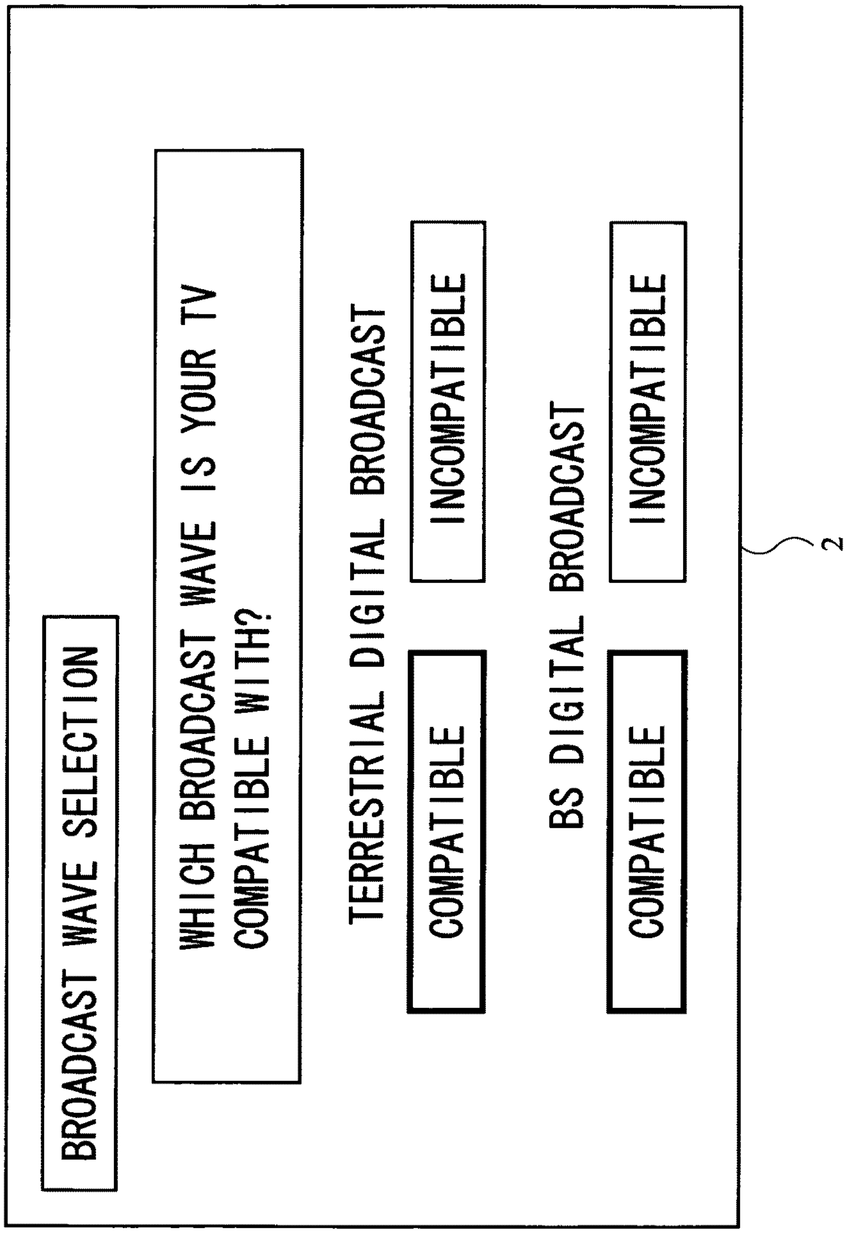
FIG. 14 is an example of a third stage screen displayed on the television 2 at the time of setting to cause the television 2 to be controllable by the operation of the controller 7.
Figure 15:
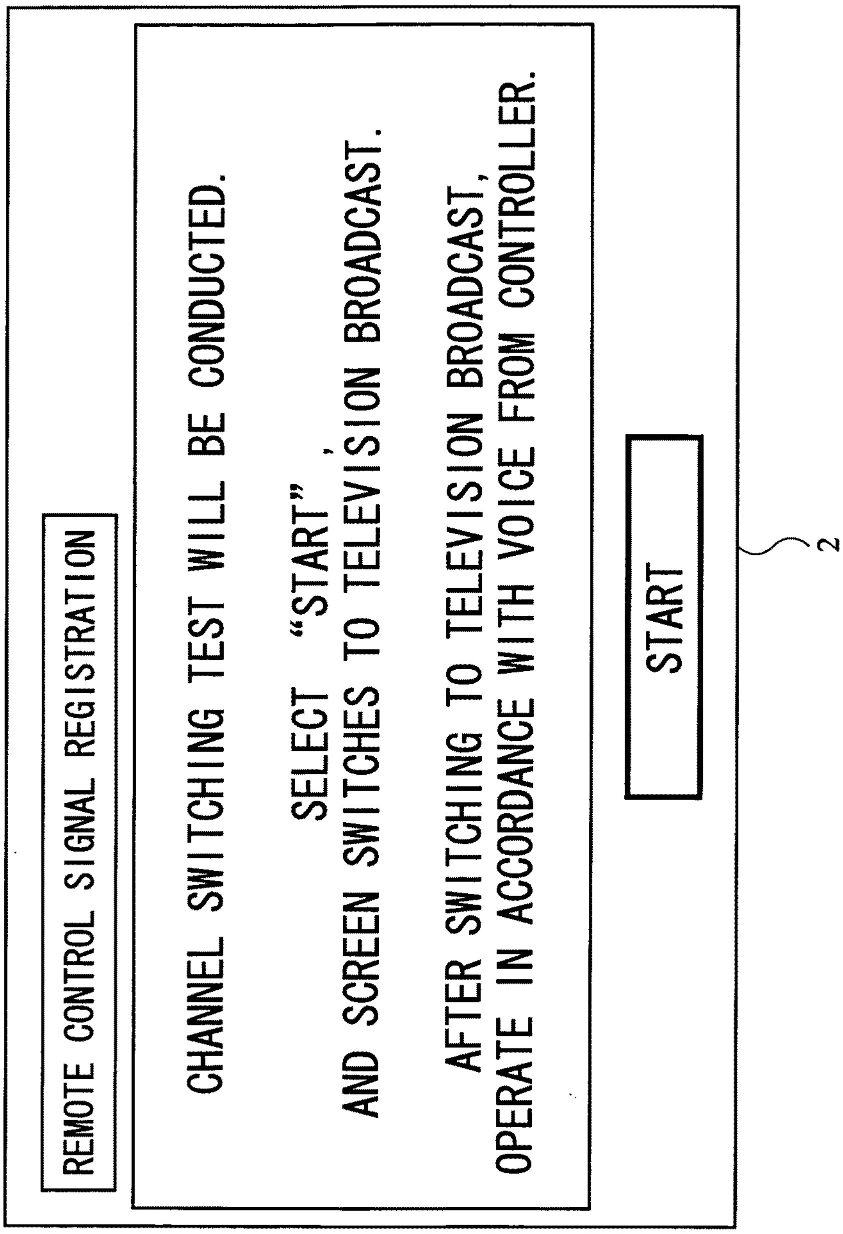
FIG. 15 is an example of a fourth stage screen displayed on the television 2 at the time of setting to cause the television 2 to be controllable by the operation of the controller 7.
Figure 16:
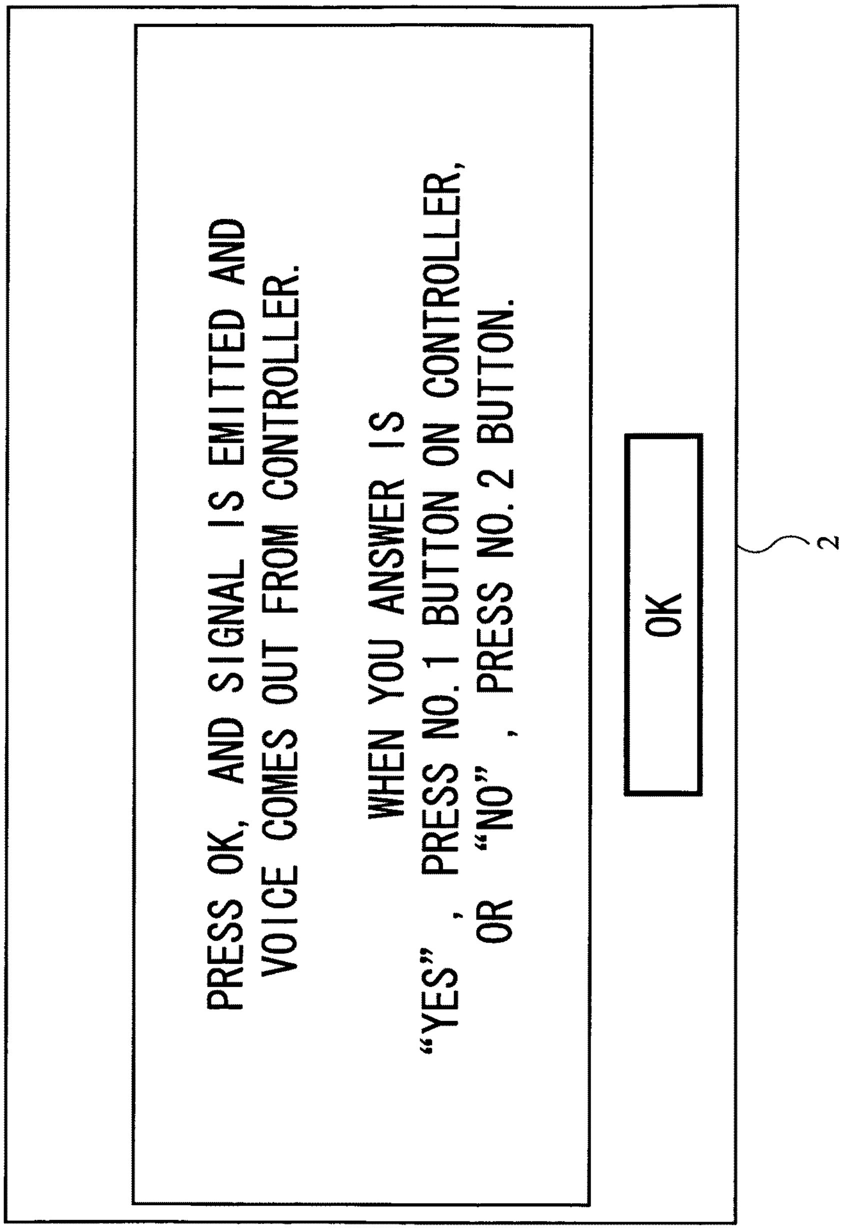
FIG. 16 is an example of a fifth stage screen displayed on the television 2 at the time of setting to cause the television 2 to be controllable by the operation of the controller 7.

With reference to FIGS. 12 to 16, an exemplary screen displayed on the television 2 in accordance with an operation by the user will be described. FIG. 12 is an example of a first stage screen displayed on the television 2 at the time of setting to cause the television 2 to be controllable by an operation of the controller 7. FIG. 13 is an example of a second stage screen displayed on the television 2 at the time of performing the setting. FIG. 14 is an example of a third state screen displayed on the television 2 at the time of performing the setting. FIG. 15 is an example of a fourth stage screen displayed on the television 2 at the time of the setting. FIG. 16 is an example of a fifth stage screen displayed on the television 2 at the time of the setting.

As shown in each of the FIGS. 12 to 16, the setting to cause the television 2 to be controllable by the operation of the controller 7 is performed in a state where an image based on the video/audio signal outputted from the game apparatus body 5 is displayed on the television 2 via the external input terminal 47. For example, when the setting to cause the television 2 to be controllable is started, an initial screen for setting a television remote control is displayed (FIG. 12). Displayed on the initial screen is a registration state to be registered in the setting ("1. register television type", "2. register remote control signal", and "3. register terminal connected to the game apparatus"). Here, the user moves the position pointed to by the controller 7 so as to correspond to a desired position on an image displayed on the television 2, and then pressed a predetermined button of the controller 7, whereby it is possible to perform an operation to select a choice displayed at the position pointed to by the controller 7. Here suppose that the user has selected "1. register television type", which was yet to be registered, by using the controller 7.

On the screen shown in FIG. 12, when the user has selected "1. register television type", a screen for encouraging the user to select a television manufacturer is displayed (FIG. 13). For example, on the screen for encouraging the user to select the television manufacturer, a list of the television manufacturers ("Company A", "Company B", "Company C" . . . ) is displayed so as to encourage the user to select, from the list, a manufacturer of the television 2 currently used. The user performs an operation to select the manufacturer of the television 2 from the list displayed on the television 2.

When the user selects the manufacturer of the television 2 on the screen shown in FIG. 13, a screen for encouraging the user to select a broadcast wave is displayed (FIG. 14). For example, on the screen for encouraging the user to select the broadcast wave, choices indicative of compatibility states with terrestrial digital broadcasting and BS digital broadcasting ("compatible", "incompatible") are respectively displayed, and the user is encouraged to select a compatibility state of the television 2 from the displayed compatibility states. Accordingly, the user performs an operation to select a compatibility state of the broadcast wave receivable by the television 2.

On the screen shown in FIG. 14, when the user selects the type of the broadcast wave receivable by the television 2, a screen indicating that registration of the remote control signal is to be started is displayed (FIG. 15). For example, on the screen indicating that the registration of the remote control signal is to be started, message indicating that switching test is to be performed is provided, and when the screen of the television 2 is switched to the television broadcast, the user is requested to perform operations in accordance with a voice from the controller 7. The user checks a content displayed on the television 2, and then performs an operation to select "start" to start the switching test.

On the screen as shown in FIG. 15, when the user selects "start", a screen which indicates an outline of the switching test to be started thereafter and matters requested to be done by the user are displayed (FIG. 16). For example, on the screen indicative of the outline of the test and the matters requested, the user is informed that after a signal is emitted in the switching test, the voice is outputted from the controller 7. The user is requested to operate the operation button of the controller 7 to answer questions. The user then confirms a content displayed on the television 2, and selects "OK". After a series of displays and operations like this, setting to cause the television 2 to be controllable by the operation of the controller 7 is performed.

Figure 17:
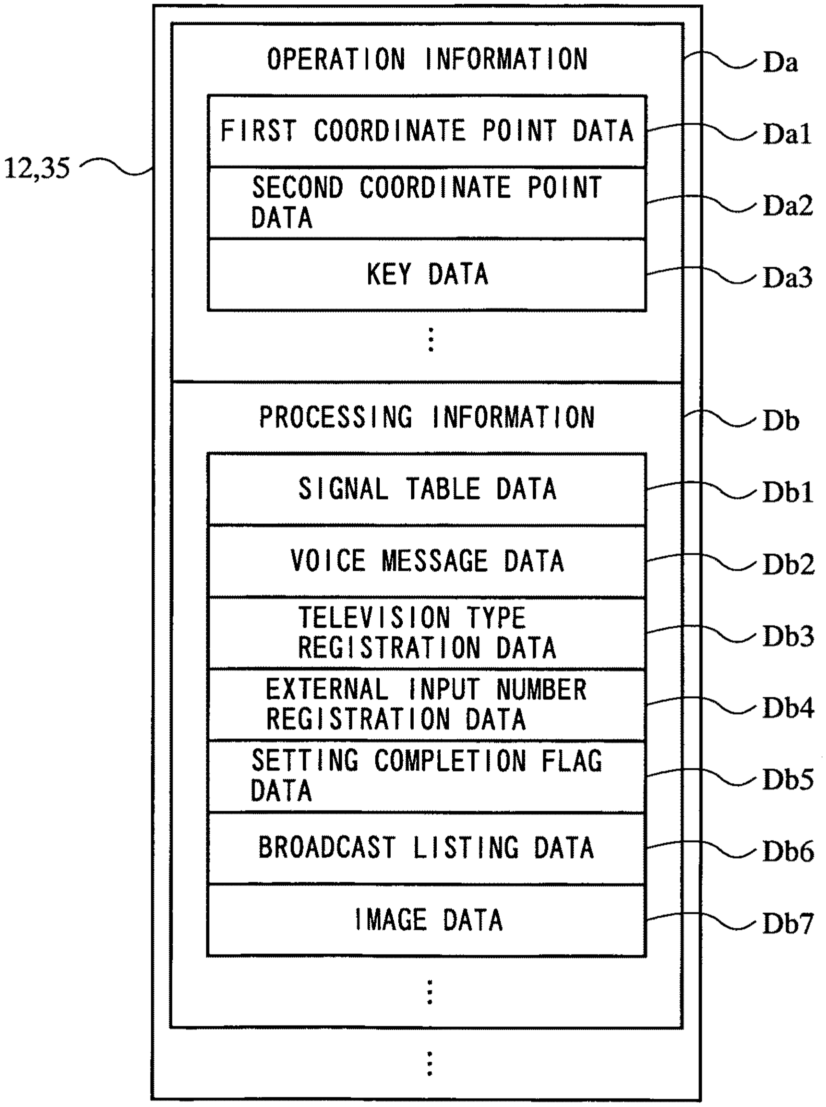
FIG. 17 is a diagram showing an example of major data stored in a main memory of the game apparatus body 5 shown in FIG. 1.

Processing performed on the game system 1 will be described in detail. With reference to FIGS. 17 to 19, major data used in the processing will be described. FIG. 17 is a diagram showing exemplary major data stored on the external main memory 12 and/or the internal main memory 35 (hereinafter collectively referred to as a main memory) of the game apparatus body 5. FIG. 18 is a diagram showing, in detail, an exemplary content of signal table data Db1 shown in FIG. 17. FIG. 19 is a diagram showing, in detail, an exemplary content of voice message data Db2 shown in FIG. 17.

As shown in FIG. 17, on the main memory, operation information Da, processing information Db and the like are stored. Further, on the main memory, in addition to data included in information shown in FIG. 17, data necessary for the information processing and the display control processing is stored as appropriate.

The operation information Da stores therein the series of pieces of the operation information (the key data, the acceleration data and the process result data) transmitted from the controller 7 as the transmission data, and the operation information is updated to latest operation information. The operation information Da includes first coordinate point data Da1 and second coordinate point data Da2 which correspond to the positional information of the process result data. The first coordinate point data Da1 represents data indicative of a position of an image of one of the markers 8L and 8R with respect to the picked up image picked up by the image pick up element 743 (a position within the picked up image). The second coordinate point data Da2 represents data indicative of a position of an image (a position within the picked up image) of the other marker. For example, the positions of the images of the markers in the picked up image are each represented based on an xy coordinate system on the picked up image.

The operation information Da includes key data Da3 and the like obtained from the operation section 72, in addition to the coordinate point data (first coordinate point data Da1 and the second coordinate point data Da2), which is exemplary process result data obtained from the picked up image. The wireless controller module 19 provided in the game apparatus body 5 receives the series of pieces of operation information transmitted from the controller 7 at a predetermined interval of 5 ms, for example, and stores the operation information in a buffer (not shown) provided in the wireless controller module 19. The latest operation information stored in the buffer is read at the interval of one frame (e.g., 1/60 sec.), which is an interval of the game process, and the operation information Da stored in the main memory is updated.

The processing information Db stores therein information for setting to cause the television 2 to be controllable by the operation of the controller 7 and information for causing the broadcast listing to be displayed on the television 2. The processing information Db includes the signal table data Db1, the voice message data Db2, television type registration data Db3, external input number registration data Db4, setting completion flag data Db5, broadcast listing data Db6, image data Db7 and the like.

The signal table data Db1 stores therein data indicative of broadcast channel signals previously set with respect to respective television types, and signal patterns of external input switching signals. Details thereof will be described later. The voice message data Db2 stores therein data indicative of a voice message outputted from the controller 7, and details thereof will be described later. The television type registration data Db3 stores therein data indicative of the television type registered by a user operation. The external input number registration data Db4 stores therein data indicative of an external input number of the television 2 connected to the game apparatus body 5. The setting completion flag data Db5 stores therein data of a setting completion flag indicative of whether or not the setting to cause the television 2 to be controllable by the operation of the controller 7 is completed. The broadcast listing data Db6 stores therein various data for displaying the broadcast listing on the television 2. The image data Db7 stores therein data indicative of images displayed on the television 2 at the time of setting processing and various images for displaying the broadcast listing on the television 1

As shown in FIG. 18, the signal table data Db1 shows information on correspondence between commands to the television 2 and signal patterns of the infrared signal to be transmitted so as to cause the television 2 to execute the commands. The signal table data Db1 includes the information on the correspondence between the commands and the signal patterns with respect to each of the television types. The signal table data Db1 includes the information on the correspondence which varies in accordance with the compatibility of the broadcast waves (e.g., compatibility/incompatibility with the terrestrial digital broadcast, compatibility/incompatibility with the BS digital broadcast) even with respect to a television type of a single television manufacturer (e.g., a television made by Company A).

For example, in the case where a television is of a type in which the television is made by Company A, and is incompatible with the terrestrial digital broadcast and the BS digital broadcast, a command to view a broadcast channel 1 on the television 2 is caused to correspond to a signal pattern a. In this type of television, commands to view respective broadcast channels on the television 2 are caused to correspond to other different signal patterns, respectively. Further, in this type, a command to view a video/audio signal inputted via an external input 1 on the television 2 is caused to correspond to a signal pattern A. Still further, in this type, commands to view, on the television 2, the video/audio signals inputted via respective external input numbers are caused to correspond to other different signal patterns, respectively.

Further, in the case where a television is of a type in which the television is made by Company A, and is incompatible with the terrestrial digital broadcast and compatible with the BS digital broadcast, a command to view the broadcast channel 1 on the television 2 is caused to correspond to a signal pattern f, and other broadcast channels are caused to correspond to other signal patterns. Further, in the type, a command to view, on the television 2, a video/audio signal inputted via the external input 1 is caused to correspond to a signal pattern F, and other external input numbers are caused to correspond to other different signal patterns, respectively. Information on the correspondence between the command to the television 2 and the signal pattern of the infrared signal to be transmitted so as to cause the television 2 to execute the command is prepared, in a similar manner, for respective types of televisions made by other manufacturers.

The signal table data Db1 is previously prepared, and for example, is previously stored in the flash memory 17. Further, the game apparatus body 5 obtains, from the network, the information on the correspondence relating to a new television type, and then may update a content of the signal table data Db1. Accordingly, in the case where a new television type becomes included, the information on the correspondence relating to the new television type may be obtained easily.

As shown in FIG. 19, the voice message data Db2 indicates voice message data outputted from the loudspeaker 706 of the controller 7. Specifically, the voice message data Db2 indicates the information on the correspondence between a message number of a voice message outputted from the loudspeaker 706 and data indicative of the voice message.

For example, a message 1 is caused to correspond to voice message data to be outputted, stating "Is screen ready for television broadcast? Press No. 1 button if 'Yes', or press No. 2 button if 'No'". A message 2 is caused to correspond to voice message data to be outputted, stating "Setting failed. Use television remote control to return to game screen". Further, a message 3 is caused to correspond to voice message data to be outputted, stating "Is screen ready for game? Press No. 1 button if 'Yes', or press No. 2 if 'No'".

The voice message data Db2 is also previously prepared, and for example, is previously stored in the flash memory 17. The game apparatus body 5 obtains new voice message data from the network and the like, and then may update a content of the voice message data Db2. Accordingly, when a new voice message is to be outputted from the controller 7, data for outputting the new voice message may be obtained easily.

Figure 20:
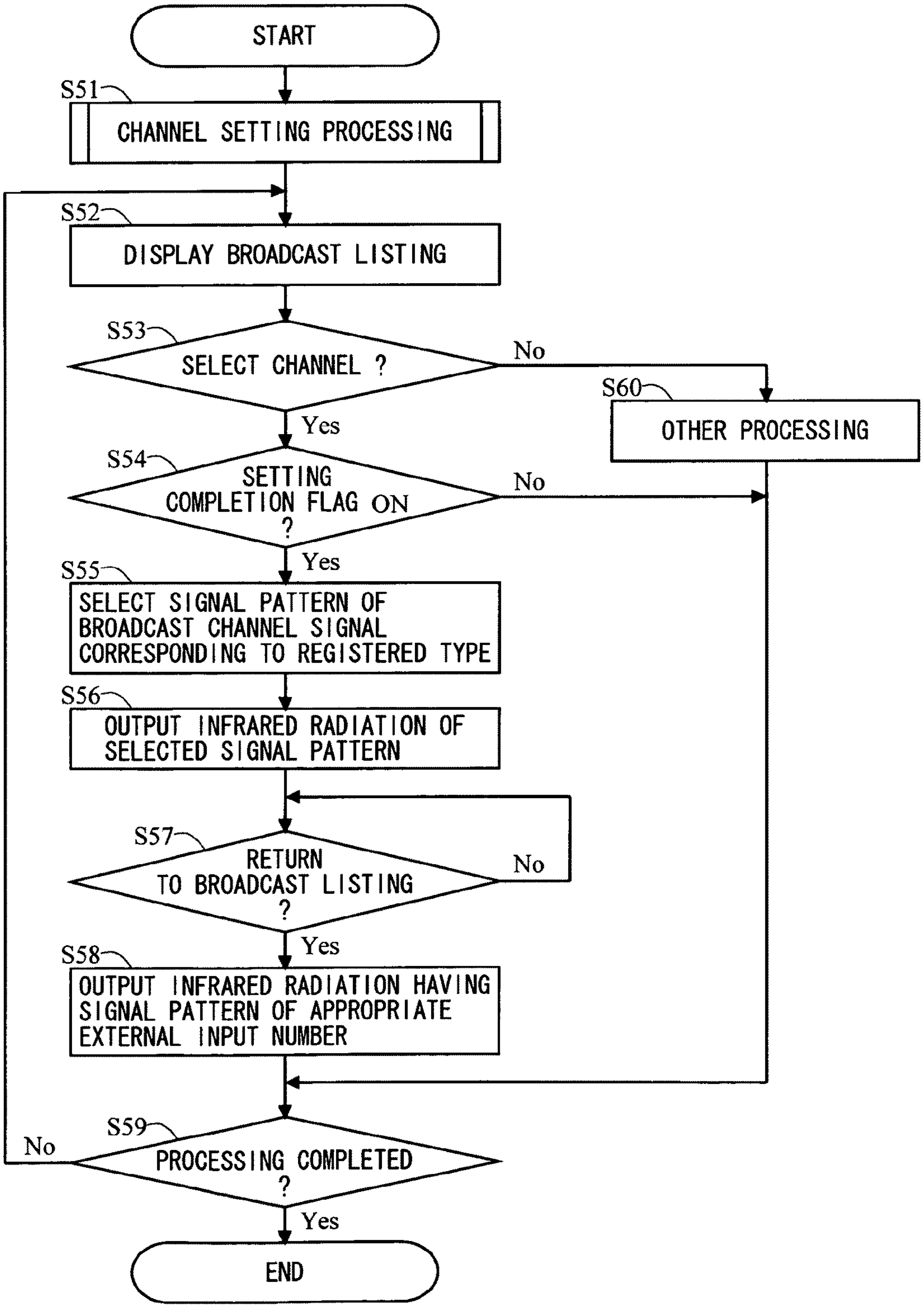
FIG. 20 is a flowchart showing a flow of a display control process executed on the game apparatus body 5 shown in FIG. 1.
Figure 21:
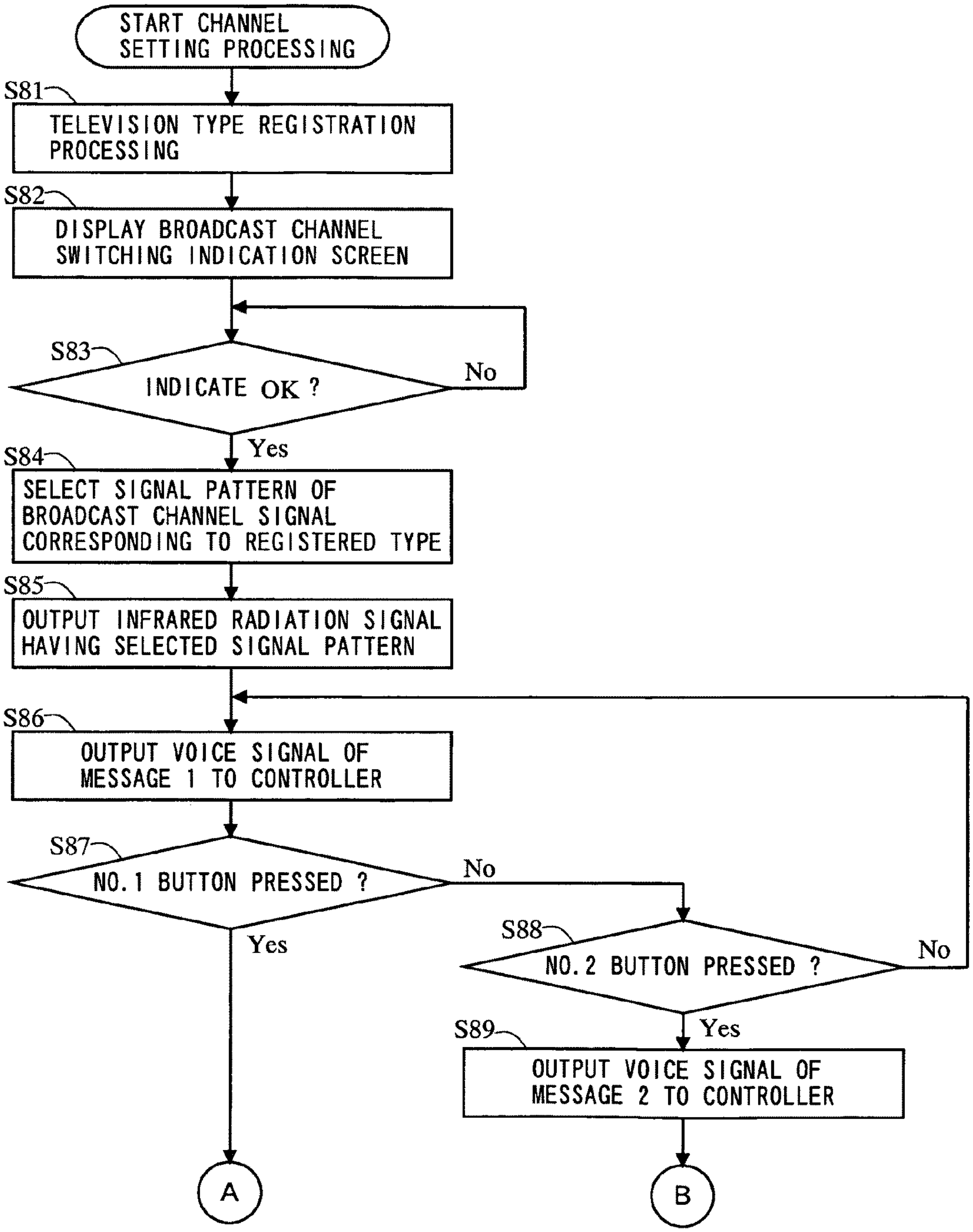
FIG. 21 is a first half of a sub-routine showing, in detail, an operation of channel setting processing in step 51 shown in FIG. 20.
Figure 22:
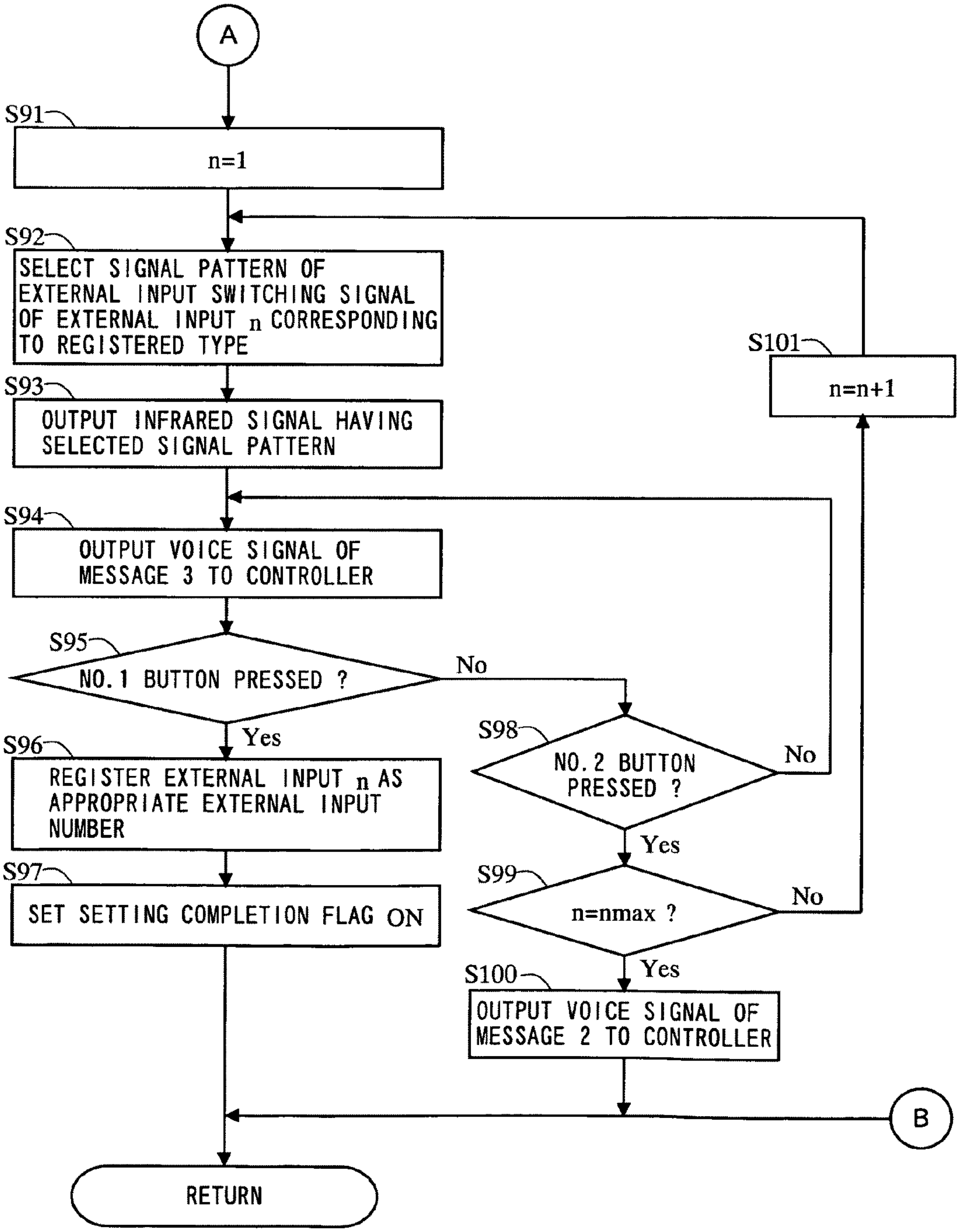
FIG. 22 is a second half of the sub-routine showing, in detail, the operation of the channel setting processing in step 51 shown in FIG. 20.
Figure 23:
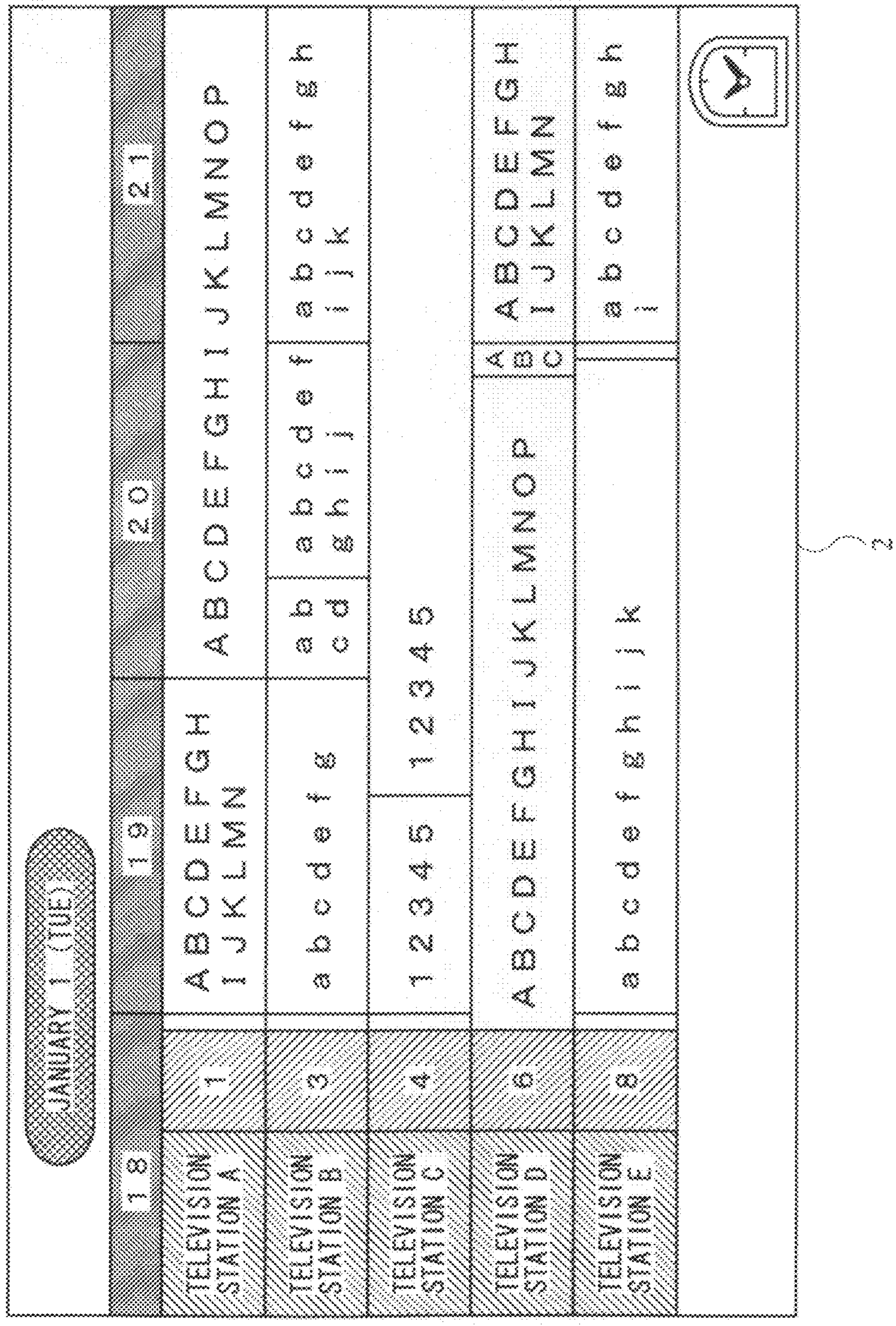
FIG. 23 is a diagram showing an exemplary display of a broadcast listing displayed on the television 2 shown in FIG. 1.

With reference to FIGS. 20 to 23, the display control processing performed on the game apparatus body 5 will be described in detail. FIG. 20 is a flowchart showing a flow of the display control processing executed on the game apparatus body 5. FIG. 21 is a first half of a sub-routine showing, in detail, an operation of channel setting processing in step 51 shown in FIG. 20. FIG. 22 is a second half of the sub-routine showing, in detail, the operation of the channel setting processing in step 51 shown in FIG. 20. FIG. 23 is a diagram showing an exemplary display of the broadcast listing displayed on the television 2. In each of the flowcharts shown in FIGS. 20 to 22, among the display control processing, setting processing for causing the television 2 to be controllable by the operation of the controller 7 and switching processing for switching a game screen and a television broadcast screen by using the broadcast listing will be mainly described. As shown in FIGS. 20 to 22, each step executed by the CPU 10 is abbreviated as "S".

When the power button 24 of the game apparatus body 5 is turned on, the CPU 10 of the game apparatus body 5 executes the start-up program stored in the ROM/RTC 13, whereby respective component units such as the main memory are initialized. The display control program stored on the optical disc 4 or another storage medium is read into the main memory, and the CPU 10 causes execution of the display control program to be ready. The flowchart shown in FIG. 20 indicates the display control processing performed after completion of the above-described processing.

As shown in FIG. 20, the CPU 10 performs the channel setting processing (step 51), and proceeds to subsequent step 52. Hereinafter, with reference to FIG. 21, the channel setting processing performed in step 51 will be described.

As shown in FIG. 21, the CPU 10 performs television type registration processing (step 81), and proceeds to the subsequent step. For example, in accordance with the user operation, the CPU 10 registers a name of the manufacturer and a compatible broadcast wave of the television 2 as a type thereof, and updates the television type registration data Db3. Specifically, in above-described step 81, the CPU 10 displays a list of the television manufacturers on the television 2 (see FIG. 13) so as to encourage the user to select the manufacturer of the television 2 currently used from the list. The CPU 10 also displays choices indicative of the compatibility state of the television 2 with respect to the terrestrial digital broadcast and the BS digital broadcast (see FIG. 14) so as to encourage the user to select a current compatibility state from the choices. The CPU 10 updates the television type registration data Db3 in accordance with the items selected by the user with the operation of the controller 7.

The user operation to be performed in step 81 is performed by obtaining the operation information received by the controller 7. Specifically, the CPU 10 updates the operation information Da by using the latest operation information having been obtained. The operation information obtained in step 53 includes the key data indicative of a manner in which the operation section 72 of the controller 7 is operated, in addition to the process result data indicative of the positions of the markers 8L and 8R on the picked up image. The communication section 75 transmits the operation information to the game apparatus body 5 at a predetermined interval (e.g., at an interval of 5ms). The CPU 10 uses the transmitted latest operation information on a frame-by-frame basis, and updates the first coordinate point data Da1, the second coordinate point data Da2, and the key data Da3. The CPU 10 refers to the first coordinate point data Da1, the second coordinate point data Da2, and the key data Da3 in the operation information Da, and determines a content of the operation performed by the user (a choice selected by the user).

The CPU 10 displays a broadcast channel switching indication screen (step 82), and waits for an indication of OK from the user (step 83). For example, in step 82, the CPU 10 displays a screen indicating that registration of the remote control signal is to be started (FIG. 15), and a screen indicative of the outline of the switching test to be performed thereafter and matters requested to be done by the user (FIG. 16). When the CPU 10 has obtained the operation information indicating OK from the controller 7, the CPU 10 proceeds to subsequent step 84. In the processing in above described step 83, the operation information Da is updated by using the operation information received by the controller 7, and whether or not the indication of OK is made is determined by using the updated operation information Da.

In step 84, the CPU 10 refers to the signal table data Db1, and selects any one of the signal patterns of the broadcast channel signals corresponding to the registered television type. For example, when the registered television is of a type in which the television is made by Company A and is incompatible with the terrestrial digital broadcast and the BS digital broadcast, the CPU 10 selects the signal pattern a corresponding to the broadcast channel 1 of the type of the television. The CPU 10 causes the infrared signal of the signal pattern selected in step 84 to be outputted from each of the infrared LEDs 8La and 8Ra included in the LED module 8 (step 85), and proceeds to the subsequent step. According to this step 85, each of the LEDs 8La and 8Ra in the LED module 8 is turned on and off repeatedly in accordance with the signal pattern. The remote control signal for viewing, on the television 2, a television broadcast (specifically, the broadcast channel of the broadcast channel signal selected in step 84) is outputted from the LED module 8. Generally a PPM (Pulse Position Modulation) signal is outputted from the LED module 8 as the remote control signal. Therefore, if the television 2 appropriately responds to the remote control signal and an operation thereof is controlled by the remote control signal, a screen based on the video/audio signal outputted from the game apparatus body 5 (e.g., the setting screen as shown in FIG. 16) is expected to switch to the television broadcast screen.

The CPU 10 refers to the voice message data Db2, outputs the voice signal indicative of the voice message data corresponding to the message 1 to the controller 7 (step 86), and then proceeds to the subsequent step. Specifically, the CPU 10 transmits the above-described voice signal from the game apparatus body 5 to the controller 7 via the wireless controller module 19 (see FIG.2). The controller 7 outputs a voice from the loudspeaker 706 in accordance with the voice message data indicated by the received voice signal. Accordingly, the user operating the controller 7 can hear the voice message (see FIG. 19) corresponding to the message 1 outputted from the loudspeaker 706 of the controller 7.

The CPU 10 determines whether or not the No. 1 button (operation button 72b) of the controller 7 is pressed (step 87), and also determines whether or not the No. 2 button (operation button 72c) of the controller 7 is pressed (step 88). When the No. 1 button is pressed, the CPU 10 proceeds to subsequent step 91 (FIG. 22). On the other hand, when the No. 2 button is pressed, the CPU 10 proceeds to subsequent step 89. When neither of the No. 1 button nor the No. 2 button is pressed, the CPU 10 returns step 86 and continues to output the voice message. In the processing in step 86 to step 88, the loudspeaker 706 of the controller 7 outputs the message 1, that is, a voice stating "Is screen ready for television broadcast? Press No. 1 button if 'Yes', or press No. 2 button if 'No'". Therefore, the user is encouraged to check the screen on the television 2 and to press the No. 1 button or the No. 2 button in accordance with the voice. In the processing in step 87 and step 88, the operation information Da is updated by using the operation information received from the controller 7, and the user operation is determined by using the updated operation information Da.

In step 89, the CPU 10 refers to the voice message data Db2, outputs a voice signal indicative of the voice message data corresponding to the message 2 to the controller 7, and terminates the processing in the current sub-routine. Specifically, in the same manner as step 86, the CPU 10 outputs a voice corresponding to the voice signal from the loudspeaker 706. Accordingly, the user operating the controller 7 can hear the voice message (see FIG. 19) corresponding to the message 2 outputted from the loudspeaker of the controller 7. Specifically, the processing in step 89 is for a case where the user has pressed the No. 2 button, that is, a case where the television broadcast screen is not displayed on the television 2. In this case, a case may be considered where the television 2 does not respond to the infrared signal outputted in step 85 appropriately, or where the television 2 cannot receive the television broadcast appropriately. Therefore, in step 89, the loudspeaker 706 of the controller 7 outputs the message 2, that is, a voice stating "Setting failed. Use television remote control to return to game screen". Accordingly, the user is informed that the setting processing which causes the television 2 to be controllable by the operation of the controller 7 cannot be performed. The user is also encouraged to display the game screen on the television 2 by using the remote control of the television 2 in accordance with the voice.

In FIG. 22, the CPU 10 sets a temporary variable n, which is to be used for processing, to 1 (step 91), and proceeds to the subsequent step.

Next, with reference to the signal table data Db1, the CPU 10 selects a signal pattern of an external input switching signal of an external input n corresponding to the registered television type (step 92). For example, in the case where the registered television is of a type in which the television is made by Company A and is incompatible with the terrestrial digital broadcast and the BS digital broadcast, and in the case of a current temporary variable n=1, the CPU 10 selects the signal pattern A corresponding to the external input 1 of the type of the television. Further, in the case of the current temporary variable n=2, the CPU 10 selects a signal pattern B corresponding an external input 2 of the type of the television. The CPU 10 then causes the infrared signal of the signal pattern selected in step 92 to be outputted from the LEDs 8La and 8Ra included in the LED module 8 (step 93), and proceeds to the subsequent step. In step 93, the remote control signal, which allows the user to view and hear, on the television 2, an image and an audio based on the video/audio signal inputted via the external input terminal 47 of the external input n, is outputted from the LED module 8. Therefore, when the television 2 appropriately responds to the remote control signal and is operated and controlled appropriately, the screen of the television 2 is switched to the screen based on the video/audio signal inputted via the external input n.

The CPU 10 refers to the voice message data Db2, outputs a voice signal indicative of the voice message data corresponding to the message 3 to the controller 7 (step 94), and proceeds to the subsequent step. Specifically, in the same manner as step 86, the CPU 10 outputs a voice corresponding to the voice signal from the loudspeaker 706. Accordingly, the user operating the controller 7 can hear the voice message (see FIG. 19) corresponding to the message from the loudspeaker of the controller 7.

The CPU 10 determines whether or not the No. 1 button (operation button 72b) of the controller 7 is pressed (step 95), and also determines whether or not the No. 2 button (operation button 72c) of the controller 7 is pressed (step 98). When the No. 1 button is pressed, the CPU 10 proceeds to subsequent step 96. On the other hand, when the No. 2 button is pressed, the CPU 10 proceeds to subsequent step 99. When neither of the No. 1 button nor the No. 2 button is pressed, the CPU 10 returns to step 94 and continues to output the voice message. In the processing in above described step 94, step 95 and step 98, the loudspeaker 706 of the controller 7 outputs the message 3, that is, the voice stating "Is screen ready for game? Press No. 1 button if 'Yes', or press No. 2 button if 'No'." Accordingly, the user is encouraged to check the screen of the television 2 and to press either of the No. 1 button or the No. 2 button in accordance with the voice. In the processing in above-described step 95 and step 98, the operation information Da is updated by using the operation information received from the controller 7, and the user operation is determined by using the updated operation information Da.

In step 96, the CPU 10 registers the external input n as an appropriate external input number in accordance with the current temporary variable n, and updates the external input number registration data Db4. The CPU 10 sets the setting completion flag ON, updates the setting completion flag data Db5 (step 97), and terminates the processing in the current sub-routine. The processing in step 96 is for a case where the user presses the No. 1 button, that is, a case where the game screen is displayed on the television 2. In other words, it is assumed that the game apparatus body 5 is connected to the external input terminal 47 of the external input n of the television 2, and the game screen is properly displayed on the television 2 via the external input terminal 47. Therefore, in step 96, the game apparatus body 5 is connected to the external input n of the television 2, and the external input n is registered as the appropriate external input number.

O the other hand, in step 99, the CPU 10 determines whether or not the current temporary variable n is a maximum value nmax of the registered television type. When the temporary variable n does not reach the maximum value nmax, the CPU 10 adds 1 to the temporary variable n (step 101), and repeats the processing after returning to step 92. On the other hand, in the case of n=nmax, the CPU 10 proceeds to subsequent step 100. The maximum value nmax is a maximum value of the external input number set to each of the television types. For example, as shown in FIG. 18, in the case where a television is of the type in which the television is made by Company A and incompatible with the terrestrial digital broadcast and the BS digital broadcast, three external input terminals are set, and thus the maximum value nmax=3. In the case where a television is of a type in which the television is made by Company A, and is incompatible with the terrestrial digital broadcast, whereas compatible with the BS digital broadcast, four external input terminals are set, and thus the maximum value nmax=4. Further in the case a television is of a type in which the television is made by Company A, and is compatible with the terrestrial digital broadcast and the BS digital broadcast, five external input terminal are set, and thus maximum value nmax=5.

In step 100, the CPU 10 refers to the voice message data Db2, and outputs the voice signal indicative of the voice message data corresponding to the message 2 to the controller 7 and terminates the processing in the current subroutine. Specifically, in the same manner as step 86,the CPU 10 outputs the voice corresponding to the above-described voice signal from the loudspeaker 706. Accordingly, the user operating the controller 7 can hear the voice message corresponding to the message 2 from the loudspeaker of the controller 7 (see FIG. 19). Specifically, the processing in step 100 represents a case where the user repeatedly presses the No. 2 button, and the temporary variable n has reached the maximum value nmax, that is, a case where the game screen is not displayed even if any one of the external input terminals 47 of the television 2 is selected. In this case, it may be considered that the television 2 does not respond to the infrared signal outputted in step 93, or that the television 2 and the game apparatus body 5 are not connected to each other appropriately. Therefore in step 100, the loudspeaker 706 of the controller 7 outputs the message 2, that is, the voice stating "Setting failed. Use remote control of the television to return to the game screen." Accordingly, the user is informed that the setting processing for causing the television 2 to be controllable by the operation of the controller 7 cannot be performed. Further, the user is also encouraged to use the remote control of the television 2 to display the game screen on the television 2 in accordance with the voice.

With reference back to FIG. 20, after the channel setting processing in step 51, the CPU 10 causes the broadcast listing to be displayed on the television 2 (step 52), and proceeds to the subsequent step. In the processing in step 52, the CPU 10 appropriately updates various pieces of information described in the broadcast listing data Db6 by using electrical broadcast listing data, which is obtained through communication with various servers connected to the network via the wireless communication module 18 and the antenna 22, and sets the broadcast listing. The CPU 10 then causes the broadcast listing to be displayed on the television 2 in accordance with the broadcast listing data Db6.

As shown in FIG. 23, for example, on the television 2, the broadcast listing is displayed in a matrix form, in which a horizontal axis represents a time axis, and a vertical axis represents a broadcast station axis. Specifically, broadcast cells corresponding to hourly time frames during which respective television station broadcast are set respectively, and broadcast titles are described in characters in the respective broadcast cells. On the broadcast listing, the user is capable of pressing a predetermined button of the controller 7, changing a position to be pointed to by the controller 7, changing a size of the characters of each of the broadcast titles, scrolling the broadcast listing, and expanding/shortening a length of the time axis. Further, when the user presses a predetermined button (e.g., the operation button 72*d* (A button)) while pointing the controller 7 to a desired broadcast cell or a desired television channel, the user can view the television broadcast on the television channel on the television 2.

The CPU 10 determines whether or not any channel displayed on the broadcast listing has been selected for viewing (step 53). Specifically, the CPU 10 updates the operation information Da by using the operation information received from the controller 7, and determines whether or not the user has selected to view a channel by using the updated operation information Da. For example, the CPU 10 calculates a position pointed to by the controller 7 by using the first coordinate point data Da1 and the second coordinate point data Da2, and selects a television channel in the broadcast listing corresponding to the pointed to position. When it is determined that the user presses a predetermined button to select to view the television channel by using the key data Da3, the CPU 10 determines that the television channel pointed to by the controller 7 is selected to be viewed on the television 2. When the selection to view the channel is performed, the CPU 10 proceeds to subsequent step 54. On the other hand, when the selection to view the channel is not performed, the CPU 10 performs other processing in accordance with the operation information Da (step 60), and proceeds to subsequent step 59.

In step 54, the CPU 10 refers to the setting completion flag data Db5, and determines whether or not the setting completion flag is set ON. When the setting completion flag is set ON, the CPU 10 proceeds to subsequent step 55. On the other hand, when the setting completion flag is set OFF, the CPU 10 proceeds to subsequent step 59.

In step 55, the CPU 10 refers to the signal table data Db1, and selects the signal pattern of the channel selected to be viewed in step 53, from among the signal patterns of the broadcast channel signals corresponding to the registered television type. For example, when the registered television type is of a type in which the television is made by Company A and is incompatible with the terrestrial digital broadcast and the BS digital broadcast, and when the channel selected to be viewed in step 53 is the broadcast channel 2, the. CPU 10 selects the signal pattern b (see FIG. 18). The CPU 10 then causes the infrared signal of the signal pattern selected in step 55 to be outputted from each of the LEDs 8La and 8Ra included in the LED module 8 (step 56), and proceeds to the subsequent step. According to step 56, the remote control signal for viewing the television broadcast on the channel, is outputted from the LED module 8, the television broadcast having been selected to be viewed on the television 2 by the user. Accordingly, the user operates the controller 7, thereby switching the screen (e.g., a broadcast listing screen as shown in FIG. 23), which is based on the video/audio signal outputted from the game apparatus body 5, to a television broadcast screen of the selected channel.

The CPU 10 waits until an operation to return to display the broadcast listing is performed (step 57). Specifically, the CPU 10 updates the operation information Da by using the operation information received from the controller 7, and determines whether or not the user has performed the operation to return to display the broadcast listing by using the updated operation information Da. For example, when the CPU 10 determines, with reference to the key data Da3, that the user presses a predetermined button (e.g. the operation button 72*f* (home button)) which indicates a return to display the game screen, the CPU 10 then determines that the operation to return to display the broadcast listing is performed. In the case where the operation to return to display the broadcast listing is performed, the CPU 10 proceeds to subsequent step 58.

In step 58, the CPU 10 outputs the infrared signal of the signal pattern of the external input number appropriate to the game apparatus body 5, and then proceeds to subsequent step 59. Specifically, the CPU 10 refers to the external input number registration data Db4, and obtains the appropriate external input number (the external input number of the external input terminal 47 of the television 2, the external input terminal 47 being connected to the game apparatus body 5). The CPU 10 refers to the signal table data Db1, and selects the signal pattern of the external input switching signal of the appropriate external input number, the signal pattern corresponding the registered television type. The CPU 10 causes the infrared signal of the selected signal pattern to be outputted from each of the LEDs 8La and 8Ra included in the LED module 8. According to step 58, the LED module 8 outputs the remote control signal for viewing and hearing, on the television 2, an image and an audio based on the video/audio signal inputted via the external input terminal 47 of the appropriate external input number. Accordingly, the image and the audio based on the video/audio signal outputted from the game apparatus body 5 connected to the external input terminal 47 can be viewed and heard on the television 2.

In step 59, the CPU 10 determines whether or not to terminates the processing. As a condition for terminating the processing, for example, when the condition for terminating the display of the broadcast listing is satisfied, or when the user performs an operation for terminating the display of the broadcast, the processing is terminated. When the processing is not terminated, the CPU 10 returns to step 52 and repeats the processing, whereas the processing is to be terminated, the CPU 10 terminates the processing in the flowchart.

As is clear from the processing in step 53 to step 58, when the setting completion flag is set OFF, the screen is not switched to the television broadcast screen even if the user performs the operation to view the television channel. This is because the setting completion flag is data which is set ON when above-described step 97, i.e., the setting processing for causing the television 2 to be controllable in accordance with the operation of the controller 7 is completed. Accordingly, when the setting completion flag is set OFF, the processing is yet to be completed. That is, when the setting processing for causing the television 2 to be controllable by the operation of the controller 7 is yet to be completed, the screen cannot be switched to the television broadcast screen even if the user performs the operation to view the channel.

After the processing in above-described step 56, any voice information may be outputted from the loudspeaker 706 of the controller 7. For example, information may be outputted from the loudspeaker 706 of the controller 7 so as to confirm whether or not the message 1, that is, the television broadcast screen, which states, "Is screen ready for television broadcasting? Press No. 1 button if 'Yes', or press No. 2 button if 'No'." is displayed. When the processing in step 56 is performed after the channel setting processing in step 51, it is less likely that the television broadcast screen is not displayed on the television 2. However, in the case where the television broadcast screen is not displayed on the television 2 in step 56 for any reason (for example, in the case the user changes the television 2 to connect the game apparatus body 5 after the channel setting processing, or in the case of a failure in the apparatus), the user cannot obtain any information from the television 2 or the game apparatus body 5. In this case, information is outputted from the loudspeaker 706 of the controller 7, whereby the user can perform an appropriate operation.

Further, after the processing in above-described step 58, any voice information may be outputted from the loudspeaker 706 of the controller 7. For example, information may be outputted from the loudspeaker 706 of the controller 7 so as to confirm whether or not the message 3, that is, the game screen (broadcast listing screen), which states, "Is screen ready for game screen? Press No. 1 button if 'Yes', or press No. 2 button if 'No'." is displayed. Accordingly, even in the case where the game screen is not displayed on the television 2 for any reason in step 58, it is possible allow the user to perform an appropriate operation by outputting information from the loudspeaker 706 of the controller 7. Further, by outputting the voice information like this, it is possible to address a case where the screen is not switched to the television broadcast screen and a case where the screen is not switched to the game screen. Accordingly, instead of performing the channel setting processing in step 51, channel setting may be accomplished by repeatedly performing the processing in step 56 and step 58 and the user operation in accordance with the respective television types.

In this manner, in the game apparatus body 5 for executing the display control program according to the present embodiment, when one of two video/audio signals (e.g., the video/audio signal from the game apparatus body 5 and the video/audio signal based on the broadcast signal received by the tuner 45 of the television 2) is selectively outputted and displayed on the television 2, it is possible to output the voice information corresponding to the selected video/audio signal from an apparatus which is different from the television 2. Accordingly, for example, when the television broadcast image based on the broadcast signal is displayed on the television 2, or even when an image generated by the game apparatus body 5 is not appropriately displayed on the television 2, information from the game apparatus body 5 can be informed to the user.

The above description is exemplified by a case where the video/audio signals indicative of the setting images (FIGS. 12 to 16) and the broadcast listing image (FIG. 23) are outputted from the game apparatus body 5 to the television 2. However, the video/audio signal indicative of other images may be outputted from the game apparatus body 5 to the television 2. For example, the video/audio signal indicative of the game image may be outputted from the game apparatus body 5 to the television 2. In this case, in the game image outputted from the game apparatus body 5 to the television 2, a broadcast channel icon, for example, is included. The user selects and operates the broadcast channel icon in the game image, whereby the infrared signal indicative of the broadcast channel signal which enables viewing of the selected broadcast channel may be outputted from the LED module 8.

The above description is exemplified by a case where when either of the video/audio based on the video/audio signal from the game apparatus body 5 or the video/audio based on the video/audio signal of the broadcast signal received by the tuner 45 of the television 2 is selectively outputted and displayed on the television 2, the voice information corresponding to the selected video/audio signal is informed from the game apparatus body 5. However, a video/audio signal based another apparatus may be acceptable. For example, certain example embodiments may be applicable to a display switching between the game apparatus body 5 connected to the external input terminal 47 of the television 2 and another apparatus connected to another external input terminal 47 (e.g., a vide/audio recording and/or reproduction apparatus such as a hard disk recorder and a personal computer). In this case, when either of the video/audio based on the video/audio signal from the game apparatus body 5 or the vide/audio based on the video/audio signal from another apparatus is selectively outputted and displayed on the television 2, the voice information corresponding to the selected video/audio signal is outputted from the game apparatus body 5.

The above description is exemplified by a case where the information corresponding the selected video/audio signal is outputted from the loudspeaker 706 of the controller 7. However, instead of the voice information, the user may be informed by using image information. For example, a display screen is provided to the controller 7, and a message (e.g., any of the above described messages 1 to 3) transmitted from the game apparatus body 5 is displayed on the display screen. Accordingly, the user views the message displayed on the display screen on the controller 7, thereby obtaining information from the game apparatus body 5. In this manner, when information is provided to the user by means of the image information, vibration may be additionally applied to the controller 7 so as to cause the user to note that the information transmitted from the game apparatus body 5 is displayed on the controller 7. As above described, the vibrator 704 is embedded in the controller 7, and thus when vibration data for causing the vibrator 704 to vibrate is transmitted to the controller 7 together with the message from the game apparatus body 5, in addition to the display of the image information, a notice by means of vibration can be provided to the user.

The voice information corresponding to the selected video/audio signal may be outputted from another apparatus. For example, a loudspeaker is provided to the game apparatus body 5 or to the LED module 8, and the above-described voice information may be outputted from the loudspeaker.

The above description is exemplified by a case where the television 2 is controlled by using the infrared signal which is outputted by turning on and off each of the LEDs 8La and 8Ra of the LED module 8 in accordance with the signal pattern. However, the infrared signal may be outputted from another apparatus. For example, an infrared radiation transmission section is provided to the controller 7, and the television 2 may be controlled by outputting the infrared signal from the infrared radiation transmission section. In this case, the infrared radiation transmission section in the controller 7 is connected to the microcomputer 751 via a line formed on the substrate 700 or the like, and outputs the infrared signal in accordance with the signal pattern transmitted from the game apparatus body 5. That is, during processing for outputting the infrared signal corresponding to the signal pattern, the CPU 10 transmits data including the signal pattern to the controller 7, and the infrared radiation transmission section in the controller 7, which has received the data, outputs the infrared signal corresponding to the signal pattern.

The above description is exemplified by a case where the operation of the television 2 is controlled by using the infrared signal. However, the operation of the television 2 may be controlled with another wireless communication method. For example, the television 2 may be controlled by using wireless communication method based on an electromagnetic wave such as a wireless LAN, a ZigBee (registered trademark) and the Bluetooth (registered trademark) if the television 2 is controllable thereby.

A mode has been described in which the image data picked up by the image pickup element 743 is analyzed so as to obtain a position coordinate points of the infrared radiation from the markers 8L and 8R and barycentric coordinate points thereof, and then the processing result data thereof is generated within the controller 7 and transmitted to the game apparatus body 5. However, another processing stage data may be transmitted from the controller 7 to the game apparatus body 5. For example, the image data picked up by the image pickup element 743 is transmitted from the controller 7 to the game apparatus body 5, and the CPU 10 performs the above-described analysis processing so as to obtain the processing result data. In this case, the image processing circuit 744 provided to the controller 7 is not required. Further, partially analyzed image data may be transmitted from the controller 7 to the game apparatus body 5. For example, data indicative of brightness, a position, an area and the like, which are obtained from the image data, is transmitted from the controller 7 to the game apparatus body 5, and the CPU 10 performs remaining analysis processing so as to obtain the processing result data.

Further, in the above description, the infrared radiation from the two markers 8L and 8R are used as the imaging targets of the imaging information calculation section 74 of the controller 7. However, another material may be used as the imaging target. For example, one marker or three or more markers are placed in the proximity of the television 2 and the infrared radiation from the markers may be used as the imaging targets of the imaging information calculation section 74. Further, the display screen of the television 2 and another luminous element (such as interior light) may be used as the imaging target of the imaging information calculation section 74. As long as a position on the display screen pointed to by the controller 7 is calculated based on the positional relation between the imaging target and the display screen of the television 2, any luminous element can be used as the imaging target of the imaging information calculation section 74.

The above description is exemplified by a mode in which the controller 7 and the game apparatus body 5 are connected to each other via the wireless communication.

However, the controller 7 and the game apparatus body 5 may be electrically connected to each other via a cable. In this case, the cable connected to the controller 7 is connected to a connection terminal of the game apparatus body 5.

Further, it is obvious that the above-described shape of the controller, the shapes, the number, the positions and the like of the operation sections 72 provided thereto, processing orders, the operation buttons and the like, which are used in the display control processing, are merely examples. Any other shapes, numbers, positions, processing orders, and operation buttons may be used according to certain example embodiments. A position of the imaging information calculation section 74 (a light entrance of the imaging information calculation section 74) in the controller 7 is not necessarily located at the front surface of the housing 71, and may be located at any other surface as long as light can be obtained from an outside of the housing 71. Further, the above description is exemplified by a mode in which the LED module 8 is located on the top of the screen of the television 2. However, the LED module 8 may be located at another position. For example, the LED module 8 may be located at a position below the screen of the television 2. Further, when the LED module 8 is not used as the imaging target of the imaging information calculation section 74 of the controller 7, the LED module 8 may be located to the left or right side of the screen of the television 2, or may be located such that a direction, to which the infrared radiation is irradiated from the LED module 8, faces the front surface of the television 2. As long as the LED module 8 is located such that the infrared signal therefrom can be received by the light receiving section 42 of the television 2, the LED module 8 may be located at any position.

The above description is exemplified by a case where an embodiment is applied to the stationary game apparatus. However, certain example embodiments may be applicable to another apparatus which is connected to the television receiver and which is operated by an input device such as the remote control. For example, certain example embodiments may be applicable to a display control on an information processing apparatus such as a general personal computer, and a video/audio recording and/or reproduction apparatus such as a DVD (Digital Versatile Disc) recorder, a DVD player, and a video recorder.

Further, the display control program of the present invention is not only previously stored in the non-volatile storage apparatus in the game apparatus body 5, but may be provided to the game apparatus body 5 via the external storage medium such as the optical disc 4. As the information storage medium storing the display control program, non-volatile semiconductor memory may be applicable in addition to a CD-ROM, a DVD and any other similar optical disc storage media. Alternatively, the display control program may be provided to the game apparatus body 5 via a wired or wireless communication line.

The storage medium having stored thereon the display control program and the display control apparatus according to certain example embodiments are capable of informing of, when any one of two video/audio signals is selectively outputted and displayed on a display apparatus such as a television receiver, information corresponding to the selected video/audio signal, and thus are useful as an apparatus such as a game apparatus and a video/audio recording and/or reproduction apparatus which are connected to the television receiver, and also as a program executed on the apparatus.

While certain example embodiments have been described in detail, the foregoing description is in all aspects illustrative and not restrictive. It is understood that numerous other modifications and variations can be devised without departing from the scope of the invention.

What is claimed is:

1. A display control apparatus that is adapted to connect to a display apparatus that is separate from the display control apparatus, the display apparatus set to be remotely controllable using wireless communication, the display apparatus including a first input for accepting a first video/audio signal from the display control apparatus and a second input for accepting a second video/audio signal from a device other than the display control apparatus, the display control apparatus comprising:

a wireless transceiver; and a processing system that includes at least one proeessor, the processing system configured to:

generate the first video/audio signal to display a first image on the display apparatus;

output the first video/audio signal to the display apparatus;

store a first signal pattern indicative of a command to cause the display apparatus to display the first image based on the first video/audio signal;

store a second signal pattern indicative of a command to cause the display apparatus to display a second image that is based on the second video/audio signal, which is provided to the display apparatus from the device different from the display control apparatus;

select a signal pattern between at least the first signal pattern and the second signal pattern;

output, via the wireless transceiver, a wireless signal having the selected signal pattern to the display apparatus, wireless signal set to cause the display apparatus to use the respective first or second input; and output information to a user, via another apparatus that is different from the display apparatus, the outputted information being in accordance with the selected signal pattern of the outputted wireless signal.

2. The display control apparatus according to claim 1, further comprising:

an input apparatus for receiving an input from a user and for outputting user input data; and wherein the processing system is further configured to acquire the user input data from the input apparatus, the another apparatus is provided in the input apparatus, and the signal pattern between the first signal pattern and the second signal pattern is selected in accordance with the acquired user input data.

3. The display control apparatus according to claim 1, wherein the information that output via the another apparatus is output to the user as a voice output.

4. The display control apparatus according to claim 1, further comprising:

wherein the processing system is further confioured to: store a plurality of pieces of information which are determined in accordance with the signal pattern;

select at least one of the plurality of pieces of information based on the selected signal pattern, wherein the information output to the user via the another apparatus is the selected at least one of the plurality of pieces of information.

5. The display control apparatus according to claim 4, wherein:

when the wireless signal having the first signal pattern is outputted, information is output via the another apparatus regarding the first video/audio signal, and when the wireless signal having the second signal pattern is outputted, information is output via the another apparatus regarding the second video/audio signal.

6. The display control apparatus according to claim 4, wherein:

when the wireless signal having the :first signal pattern is outputted, the outputted information includes information for encouraging the user to check whether or not the first image is displayed on the display apparatus, and when the wireless signal having the second signal pattern is outputted, the outputted information includes information for encouraging the user to check whether or not the second image is displayed on the display apparatus.

7. The display control apparatus according to claim 2, wherein:

when the wireless signal having the first signal pattern is outputted, the outputted information includes information for encouraging the user to check whether or not the first image is displayed on the display apparatus, when the wireless signal having the second signal pattern is outputted, the outputted information includes information for encouraging the user to check whether or not the second image is displayed on the display apparatus, and the user input data includes a result of the check on the input apparatus.

8. The display control apparatus according to claim 7, wherein the results of the check is that the first image or the second image is not displayed, the information outputted to a user via the another apparatus includes information that a remote control between the display apparatus and the display control apparatus is invalid.

9. The display control apparatus according to claim 2, wherein:

the display apparatus includes:

a plurality of external input terminals to each of which a video/audio signal is externally inputted; and a tuner for receiving a television signal from a broadcast station and for generating the second video/audio signal, the display control apparatus is configured to connect to an external input terminal of the plurality of external input terminals, the first signal pattern represents a command to cause the first image, which is based on the video/audio signal inputted to each of the plurality of external input terminals, to be displayed on the display apparatus, and includes a plurality of signal patterns which are different from one another and respectively correspond to the plurality of external input terminals, in the case of selecting the first signal pattern, the plurality of signal patterns is selected, one by one, with respect to each of the plurality of external input terminals, the outputted information includes information for encouraging the user to input a result of whether or not the first image is displayed on the display apparatus, and wherein the processing system is further configured to specify, in accordance with the acquired user input data, a signal pattern, from among the plurality of signal patterns, which corresponds to the external input terminal that the display control apparatus is connected to.

10. The display control apparatus according to claim 1, wherein:

the display apparatus includes:

an external input terminal to which an external video/audio signal is inputted; and a tuner for receiving a television signal from a broadcast station and for generating the second video/audio signal, the display control apparatus is configured to connect to the external input terminal and output the first video/audio signal, the first signal pattern represents a command to cause the first image, which is based on the first video/audio signal inputted to the external input terminal, to be displayed on the display apparatus, the second signal pattern represents a command to cause the second image based on the second video/audio signal, which is generated from the television signal received by the tuner, to be displayed on the display apparatus, the outputted information includes information for encouraging a user to check whether or not the first image is displayed on the display apparatus when the wireless signal having the first signal pattern is outputted, and the outputted information includes information for encouraging the user to check whether or not the second image is displayed on the display apparatus when the wireless signal having the second signal pattern is outputted.

11. The display control apparatus according to claim 1, wherein:

the display apparatus includes a plurality of external input terminals to each of which a video/audio signal is externally inputted, the device for outputting the second video/audio signal and the display control apparatus are respectively connected to different ones of the plurality of external input terminals, the first signal pattern represents a command to cause the first image, which is based on the first video/audio signal outputted from the display control apparatus via one of the plurality of external input terminals, to be displayed on the display apparatus, the second signal pattern represents a command to cause the second image, which is based on the second video/audio signal outputted from the apparatus via one of the plurality of external input terminals, to be displayed on the display apparatus, the outputted information includes information for encouraging a user to check whether or not the first image is displayed on the display apparatus when the wireless signal having the first signal pattern is outputted, and the outputted information includes information for encouraging the user to check whether or not the second image is displayed on the display apparatus when the wireless signal having the second signal pattern is outputted.

12. The display control apparatus according to claim 2, wherein:

the input apparatus includes:

a pointer configured to point to an arbitrary position on the first image outputted to the display apparatus and which outputs position data for acquiring the position as the user input data; and a plurality of buttons, each of which are operable by the user for an operation thereof, and which each outputs key data indicative of a result of the operation as the user input data, the processing system is further configured to calculate a pointed to position on the first image in accordance with the acquired position data, wherein the second signal pattern is selected when the calculated pointed to position stays within a predetermined area on the first image, and the first signal pattern is selected when the acquired key data indicates that a predetermined button, among the plurality buttons, is operated.

13. The display control apparatus according to claim 12, wherein:

the display apparatus includes a tuner for receiving any one of television signals from a plurality of broadcast stations and for generating the second video/audio signal, wherein the processing system is further configured to generate a broadcast listing as the first image, the broadcast listing showing broadcasts to be broadcasted by the plurality of broadcast stations, the second signal pattern represents a command to specify a broadcast station, from which the tuner is to receive the one television signal to generate the second video/audio signal, and also to cause the second image based on the second video/audio signal to be displayed on the display apparatus, and includes a plurality of different signal patterns which corresponds to each of the plurality of broadcast stations, and when the calculated pointed to position overlaps with one broadcast station of the plurality of broadcast stations displayed on the broadcast listing, a signal pattern is selected, from among the plurality of signal patterns, corresponding to the one broadcast station.

14. The display control apparatus according to claim 1, wherein:

the display apparatus is remotely controllable by using infrared communication, and the wireless signal is outputted using infrared communication.

15. A non-transitory computer readable storage medium having stored thereon a display control program for controlling a display apparatus that is remotely controllable through wireless communication, the display control program set to be executed by a processing system of a display control apparatus that is configured to connect to the display apparatus, the display control program comprising instructions that are configured to:

generate a first video/audio signal to display a first image on the display apparatus;

output the first video/audio signal to the display apparatus;

select a signal pattern from among at least first and second signal patterns, the first and second signa1 patterns stored on a storage medium of the display control apparatus, the first signal pattern indicative of a command to cause the first image based on the first video/audio signal to be displayed on the display apparatus, the second signal pattern indicative of a command to cause a second image based on a second video/audio signal, which is obtained from a device different from the display control apparatus, to be displayed on the display apparatus;

cause the wireless signal having the selected signal pattern to be outputted from the display control apparatus via wireless communication; and output information to a user, via another apparatus that is different from the display apparatus, the outputted information being based on the selected signal pattern.

16. The display control apparatus of claim 1, wherein the processing system is further configured to receive, via the wireless transceiver, a command signal based on user input provided to the another apparatus.

17. The display control apparatus of claim 1, wherein the another apparatus is physically separate from the display control apparatus and is configured to wirelessly communicate with the display control apparatus.

18. A display control system configured to connect to a display apparatus that is separate from the display control apparatus, the display apparatus set to be remotely controllable using wireless communication, the display apparatus including a first input for accepting a first video/audio signal from the display control apparatus and a second input for accepting a second video/audio signal from a source other than the display control apparatus, the display control system comprising:

a wireless transceiver; and a processing system that includes at least one processor, the processing system configured to:

generate the first video/audio signal to display a first image on the display apparatus;

output the first video/audio signal to the display apparatus;

store a first signal pattern indicative of a command to cause the display apparatus to display the first image based on the first video/audio signal;

store a second signal pattern indicative of a command to cause the display apparatus to display a second image that is based on the second video/audio signal, which is provided to the display apparatus from the source other than the display control system;

select a signal pattern between at least the first signal pattern and the second signal pattern;

output, via the wireless transceiver, a wireless signal having the selected signal pattern, the wireless signal set to cause the display apparatus to use the respective first or second input; and output information to a user, via another apparatus that is different from the display apparatus, the outputted information being in accordance with the selected signal pattern.

19. A method of using a display control apparatus to control a display device, the display control apparatus including a transceiver, a processing system that includes at least one processor, and a storage medium, the display device including a first input and a second input, the first input configured to accept a first video/audio signal from the display control apparatus, the second input configured to accept a second video/audio signal from a source other than the display control apparatus, the display device set to receive signals for controlling functionality of the display device, the method comprising:

generating the first video/audio signal on the display control apparatus;

outputting the first video/audio signal to the display device;

storing a first signal pattern that is indicative of a command that, when received by the display device, causes the display device to display a first image on the display device based on the first video/audio signal that is accepted through the first input;

storing a second signal pattern that is indicative of a command that, when received by the display device, causes the display device to display a second image on the display device based on the second video/audio signal that is accepted through the second input;

selecting a signal pattern between at least the first signal pattern and the second signal pattern;

outputting, via the transceiver and to the display device, a signal that is based on the selected signal pattern, where the outputted signal is set to cause the display device to control functionality based on the outputted signal, the functionality being to display the first or second image in accordance with the outputted signal; and outputting information in accordance with the selected signal pattern to a user from an apparatus that is different from the display apparatus.

20. A system comprising:

a display apparatus that is configured to output a video signal to a display screen and/or an audio signal to at least one speaker, the display apparatus including a wireless receiver that is configured to receive commands from a wireless transmitter, the received commands set to control at least a first function out of a plurality of functions that are controllable on the display apparatus via wireless transmission;

a stationary processing apparatus that includes:

a transceiver system that is at least configured to wirelessly transmit a control signal to the display apparatus;

a storage medium; and a processing system that includes at least one processor, the processing system configured to:

generate an image to be output to the display apparatus to be displayed on a display screen; and store, on the storage medium, a first signal pattern that is indicative of a command that is set to cause the first function of the display apparatus to be processed by the display apparatus; and an input device that is configured to accept input and communicate the input with at least the stationary processing apparatus, the input device including at least one sensory output, wherein the processing system is further configured to:

receive, via the transceiver system, data based on the accepted input;

select the first signal pattern based on the received data; and transmit, via the transceiver system, a wireless signal having the first signal pattern to the display apparatus, wherein the input device is further configured to output, via the at least one sensory output, information related to the transmission of the wireless signal from the stationary processing apparatus.

21. The system of claim 20, wherein the at least one sensory output is an audio output.

22. The system of claim 20, wherein the at least one sensory output is a visual output.

23. The system of claim 20, wherein:

the input device further includes:

an imager that is configured to obtain at least one image; and a plurality of buttons, each of which are operable by a user, the processing system if further configured to calculate a position indicated by the input device based on the obtained at least one image, the first signal pattern is selected additionally based on the calculated position.

* * * * *